INVENTOR.
RICHARD M. GOODWIN
BY
HIS ATTORNEYS.

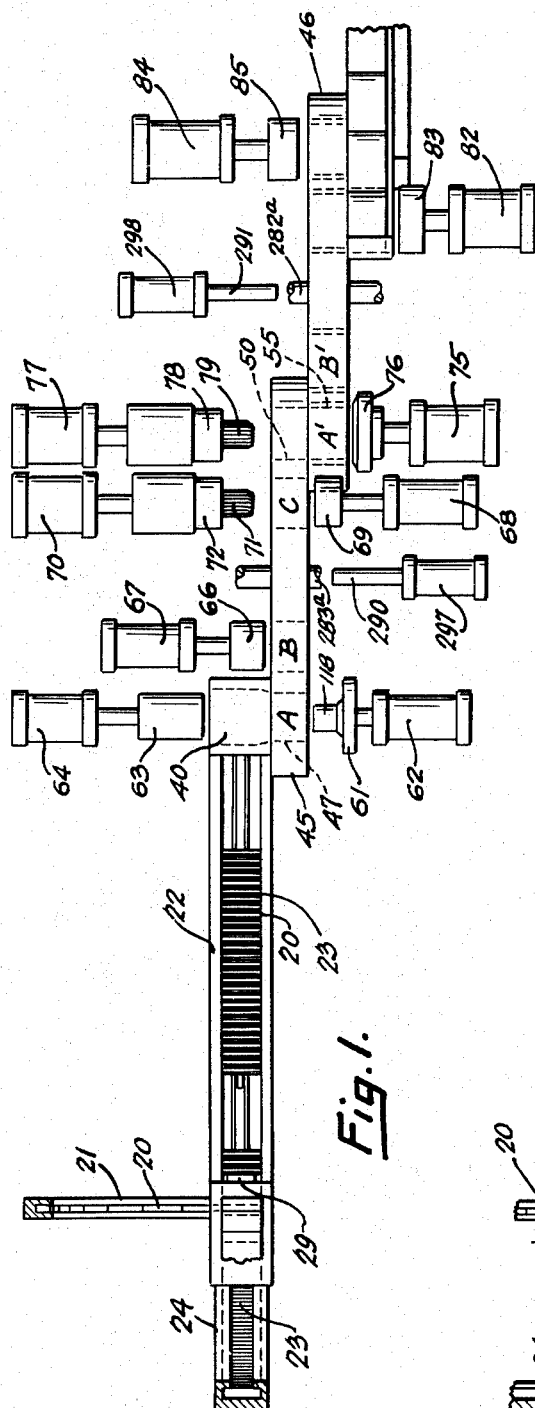

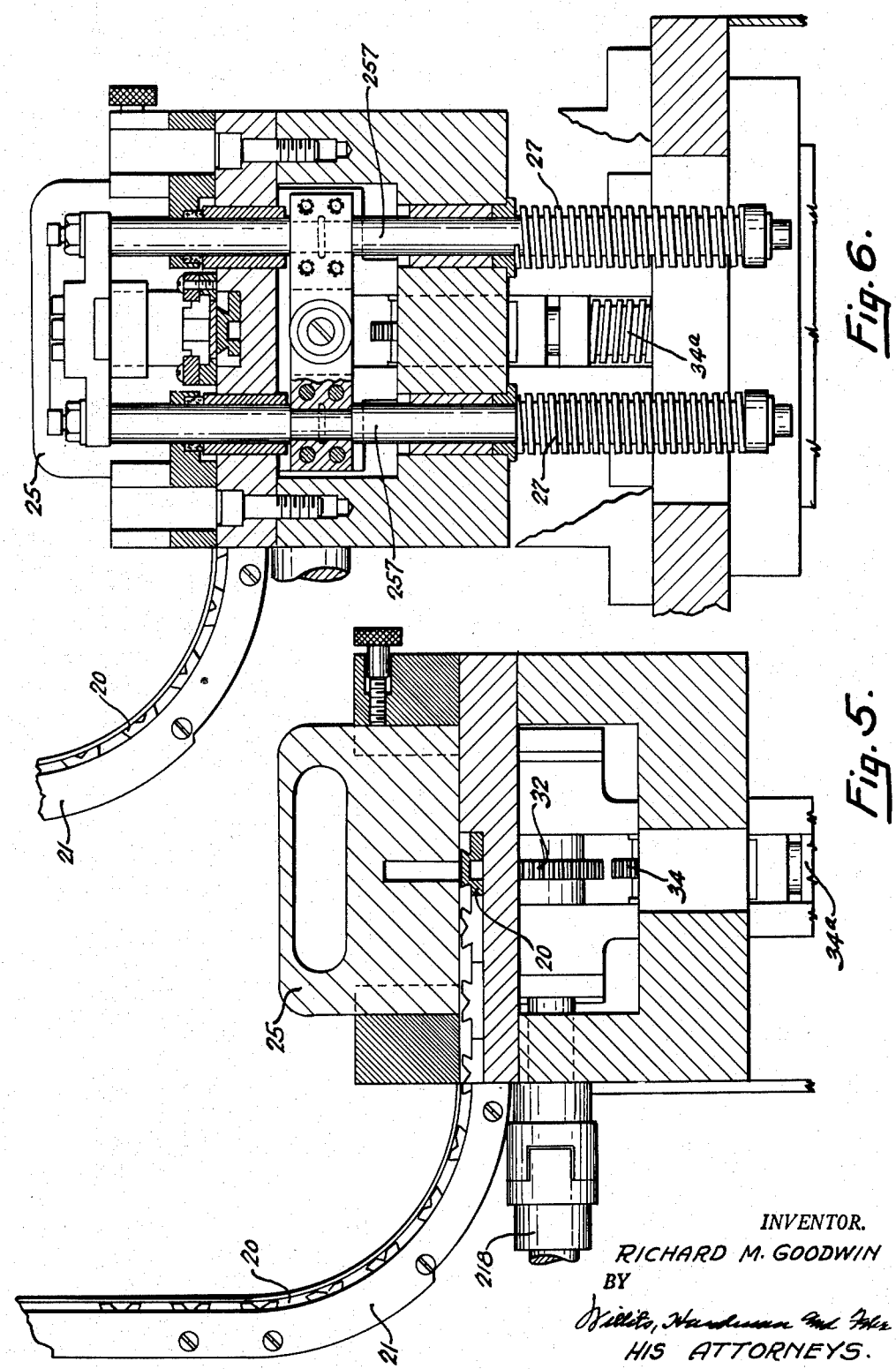

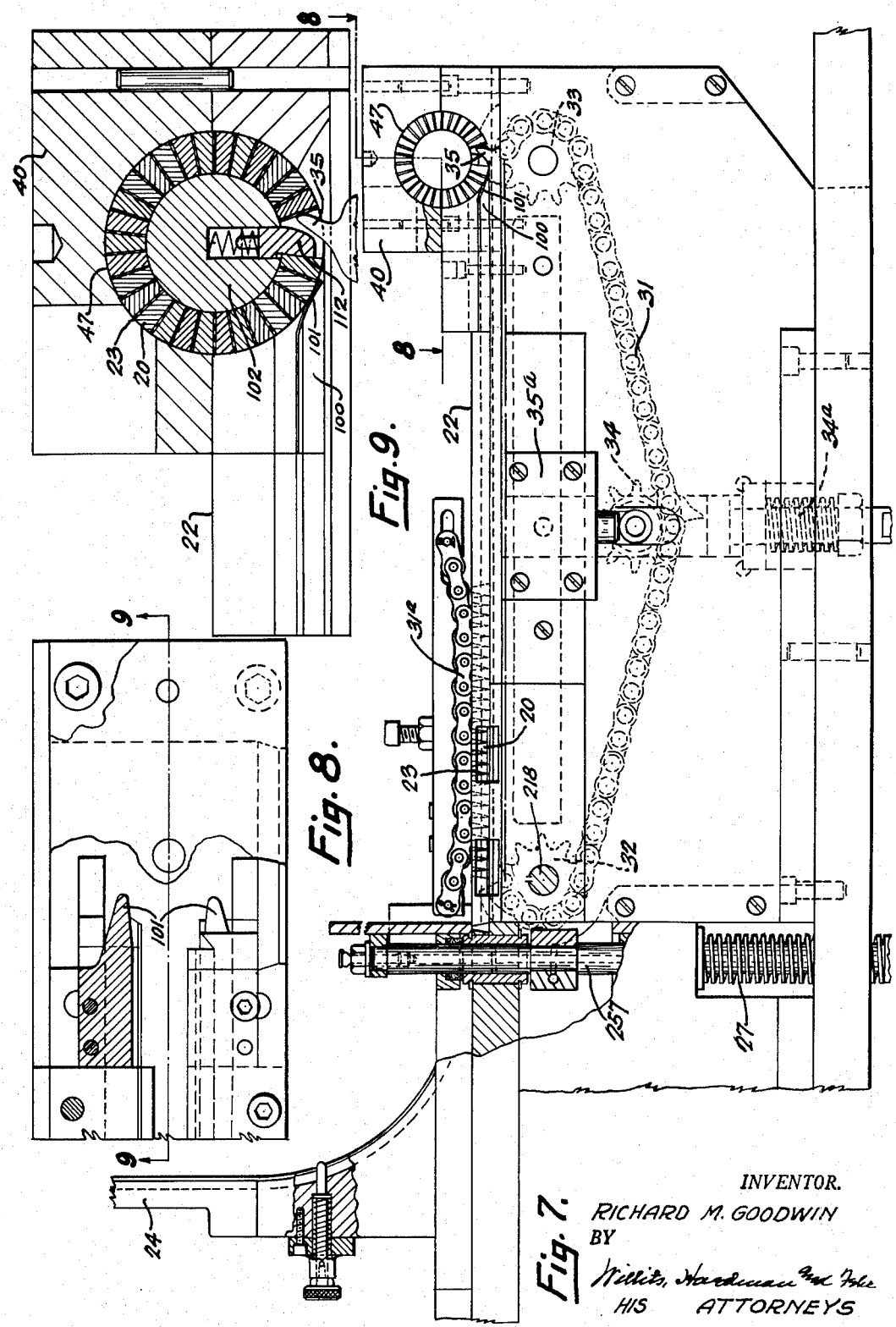

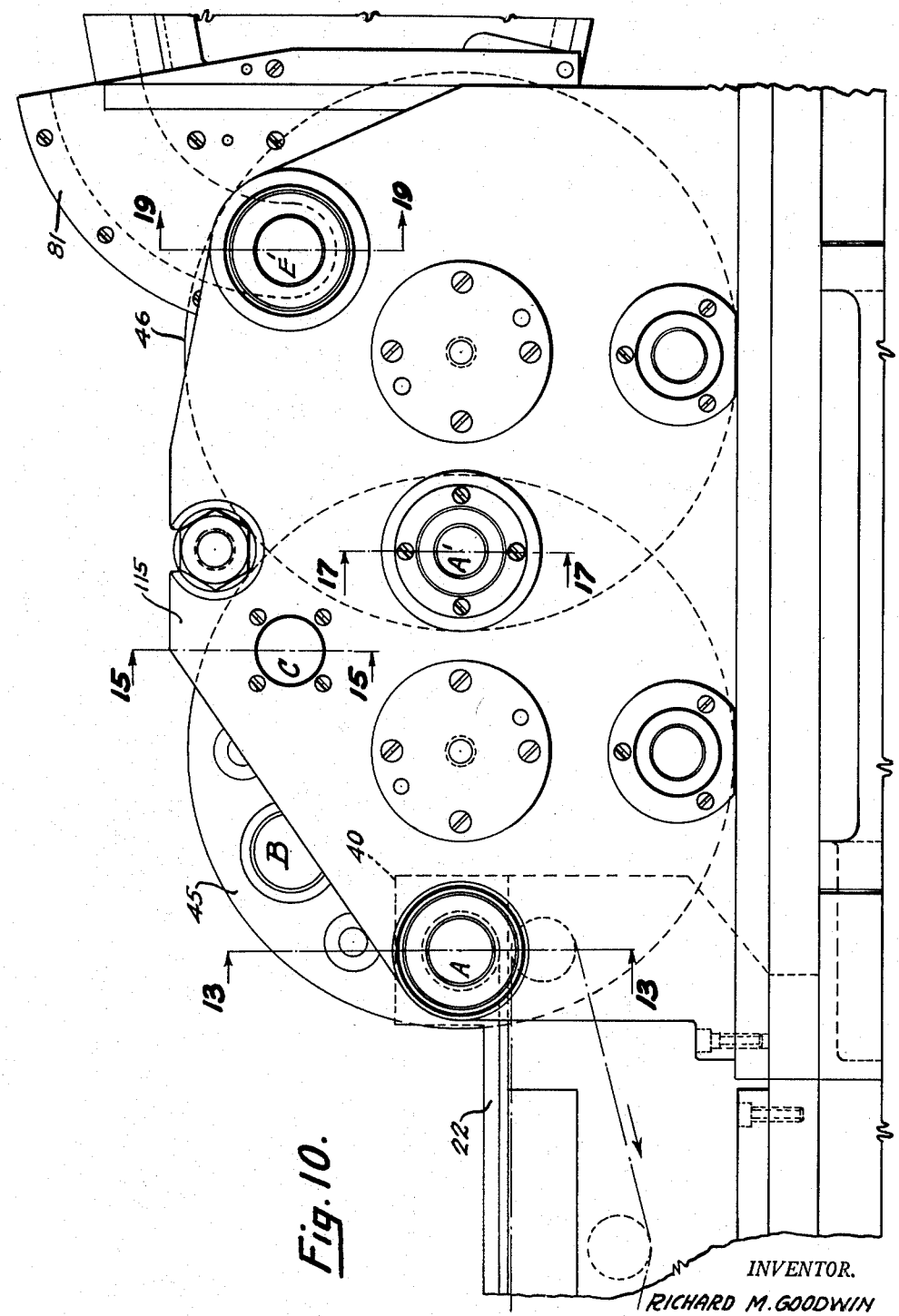

Jan. 10, 1956 R. M. GOODWIN 2,729,882
COMMUTATOR ASSEMBLING MACHINE
Filed Jan. 18, 1952 14 Sheets-Sheet 7

INVENTOR.
RICHARD M. GOODWIN
BY
HIS ATTORNEYS.

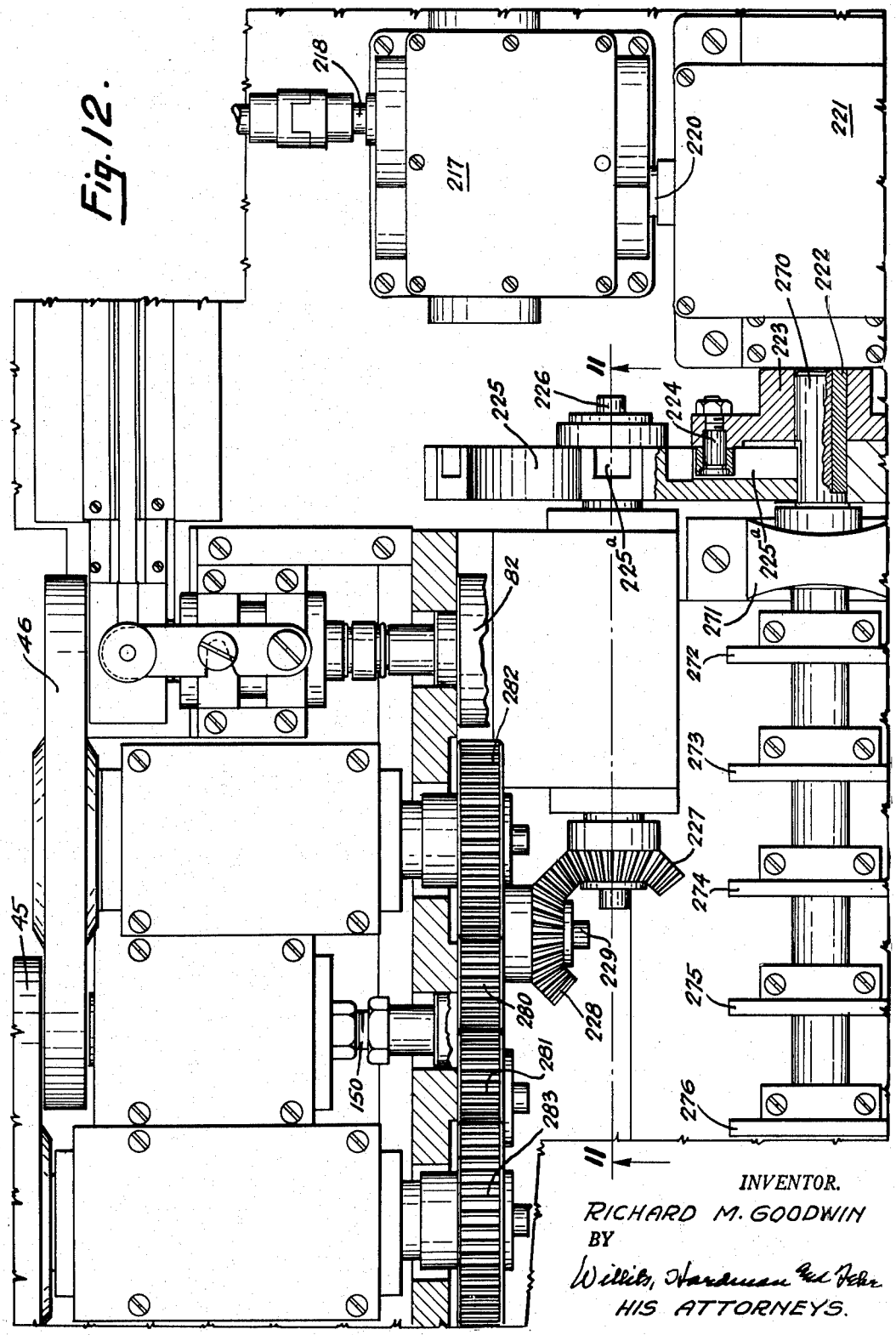

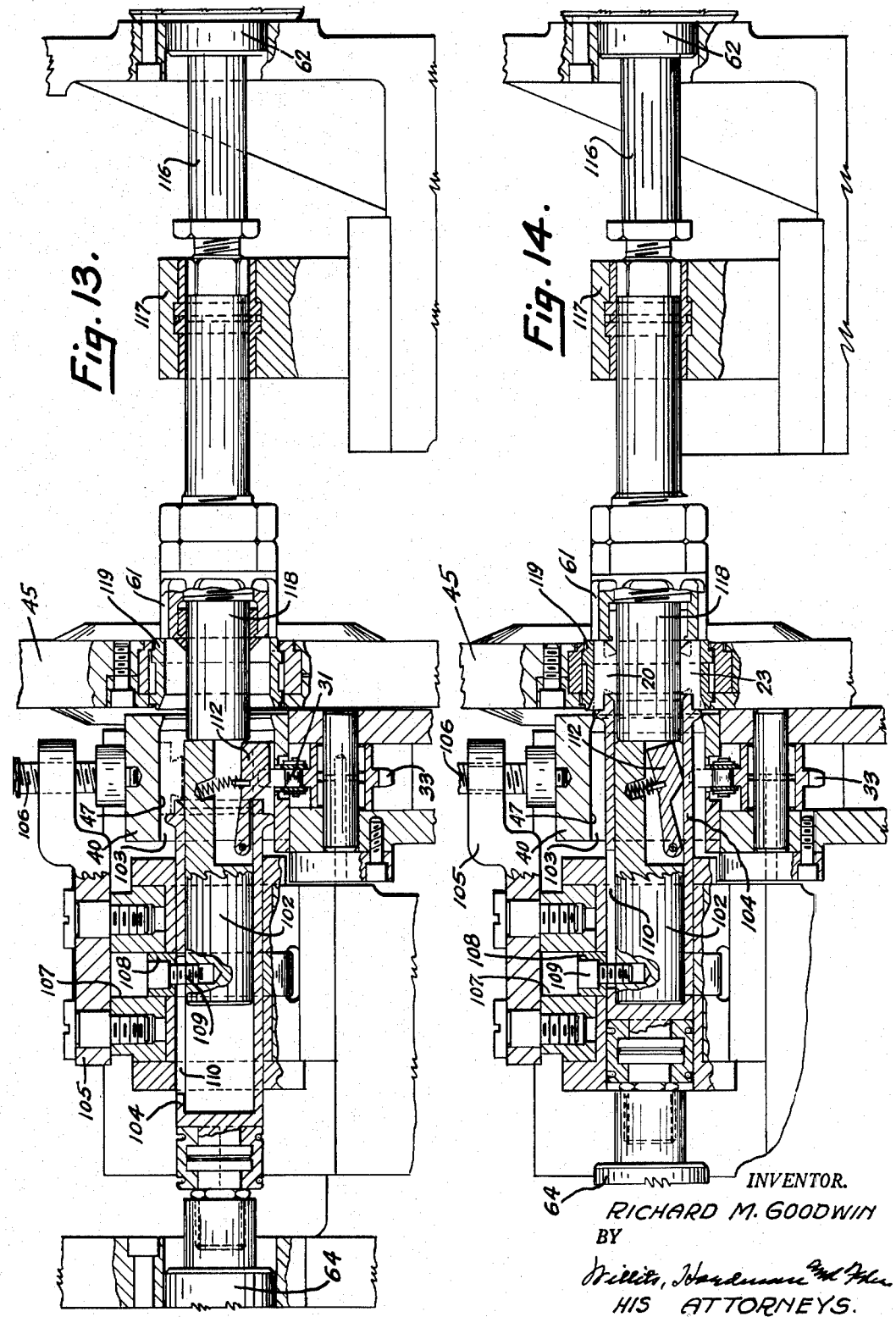

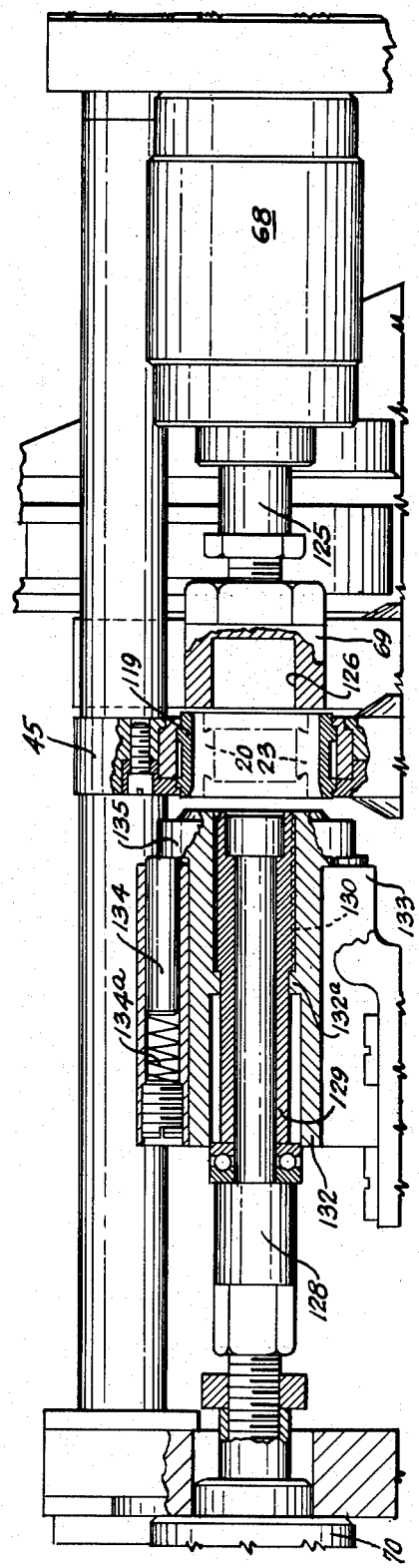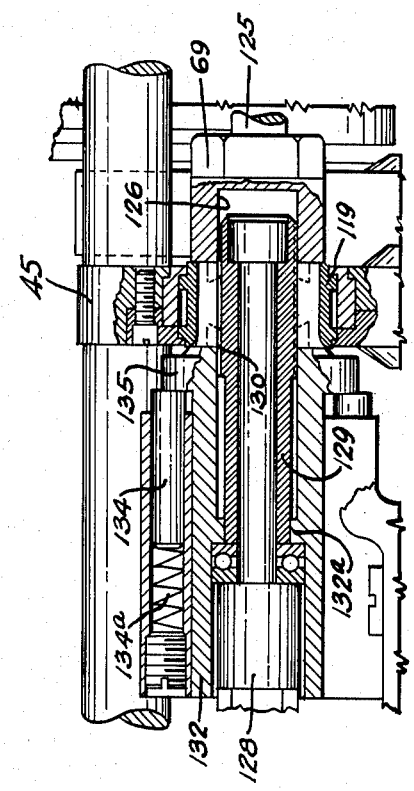

Jan. 10, 1956  R. M. GOODWIN  2,729,882
COMMUTATOR ASSEMBLING MACHINE
Filed Jan. 18, 1952  14 Sheets-Sheet 11
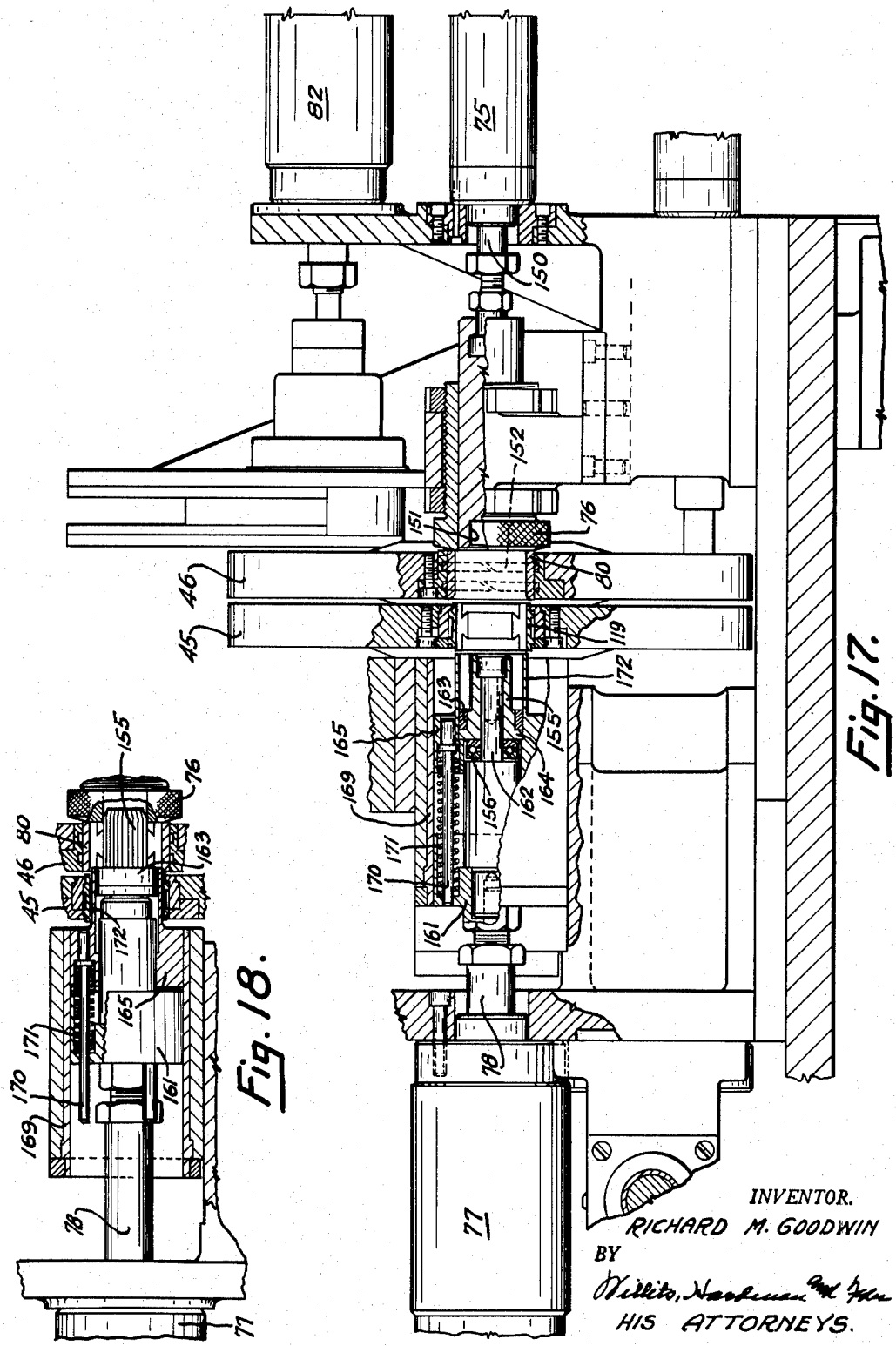
INVENTOR.
RICHARD M. GOODWIN
BY
HIS ATTORNEYS.

Jan. 10, 1956  R. M. GOODWIN  2,729,882
COMMUTATOR ASSEMBLING MACHINE
Filed Jan. 18, 1952  14 Sheets-Sheet 12
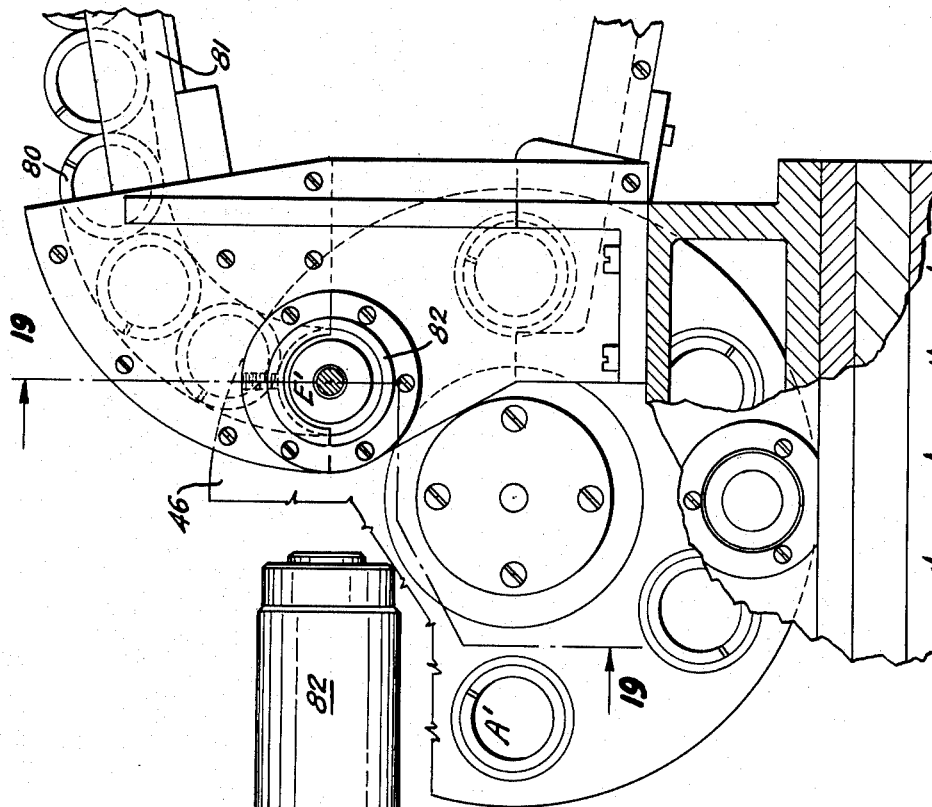
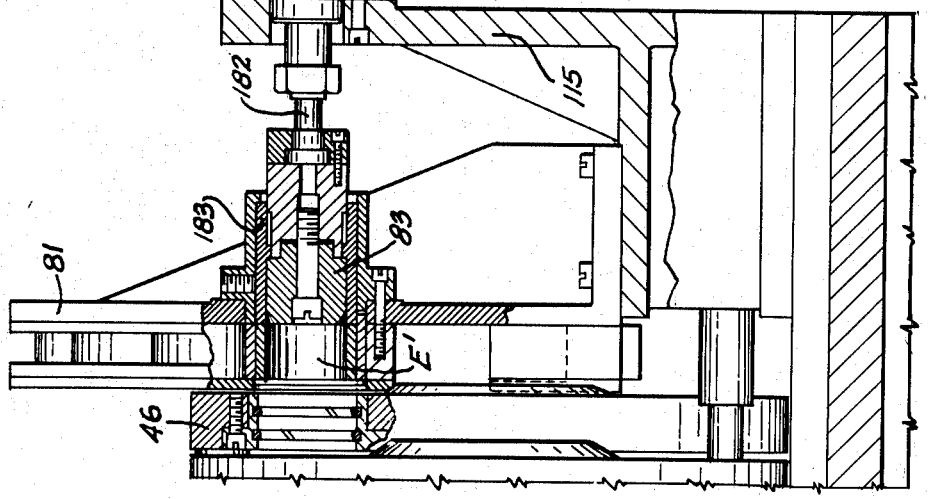
INVENTOR.
RICHARD M. GOODWIN
BY
HIS ATTORNEYS.

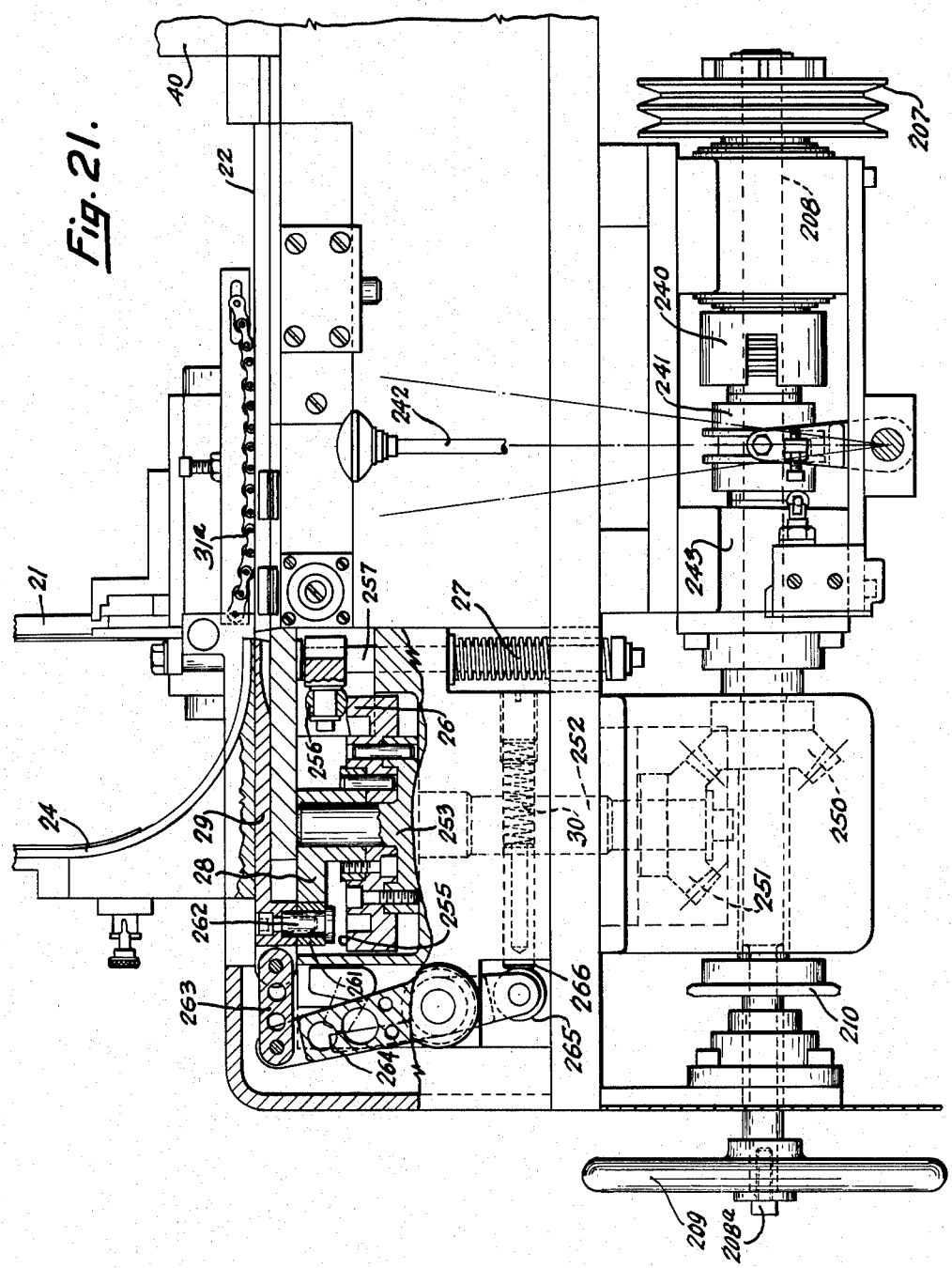

United States Patent Office 2,729,882
Patented Jan. 10, 1956

2,729,882

COMMUTATOR ASSEMBLING MACHINE

Richard M. Goodwin, Anderson, Ind., assignor to General Motors Corporation, Detroit, Mich., a corporation of Delaware Application January 18, 1952, Serial No. 267,098

4 Claims. (Cl. 29—205)

This invention relates to a machine for assembling and temporarily holding alternate metal and insulating segments for a dynamo-electric machine commutator in an annulus.

The object of the present invention is to provide an automatic machine which is operative to assemble a predetermined number of alternate metal bars and insulating separators into an annulus inside a work ring, in which said annulus is grippingly held for the purpose of performing other necessary commutator assembling operations.

Such operations would include the insertion of a bearing tube and suitable clamping rings, followed by operations on the tube for urging and holding the clamping rings against opposite portions of the segmental annulus for clamping said segments together as a unit, forming a commutator for an electric machine.

Further objects and advantages of the present invention will be apparent from the following description, reference being had to the accompanying drawings wherein a preferred embodiment of the present invention is clearly shown.

In the drawings:

Fig. 1 is a schematic view in top elevation, showing certain operating elements of the machine in their relative positions for performing the complete assembling operation.

Fig. 2 is a schematic view in side elevation of the machine parts shown in Fig. 1, certain parts being omitted for the sake of illustrating other parts.

Fig. 5 is a part sectional view taken along the line and in the direction of the arrows 5—5 of Fig. 3 and illustrating the metal segment bar feed mechanism.

Fig. 6 is a fragmentary sectional view of the machine taken along the line and in the direction of the arrows 6—6 of Fig. 3, illustrating the mechanism for stripping single insulator segments from the feed and placing each in juxtaposition to the placed metal bar segment.

Fig. 7 is a fragmentary view of the machine showing the chain conveyor and its slack takeup device as associated with the stationary annulus forming block.

Fig. 8 is a detail view partly in section taken along the line 8—8 of Fig. 7.

Fig. 9 is a detail sectional view taken substantially along the line and in the direction of the arrows 9—9 of Fig. 8.

Fig. 10 is a side elevation of a part of the machine showing the relative arrangement and mounting of the two rotatable disc conveyors.

Fig. 12 is a plan view of the driving mechanism shown in Fig. 11.

Fig. 13 is a detail sectional view taken along the line and in the direction of the arrows 13—13 of Fig. 10, showing the mechanism for transferring the segmental annulus from the assembling block into the one rotatable disc conveyor.

Fig. 14 is a view similar to Fig. 13 showing the parts in their position of completion of operation.

Fig. 15 is a detail sectional view taken along the line and in the direction of the arrows 15—15 in Fig. 10, detailedly illustrating parts for performing the segment-aligning function of the machine.

Fig. 16 is a view similar to Fig. 15, showing the machine parts in the position of having completed the segment-aligning operation.

Fig. 17 is a part sectional view taken substantially along the line and in the direction of the arrows 17—17 of Fig. 10, illustrating the mechanism for transferring the segments annulus from the one conveyor disc to the other.

Fig. 18 is a view of a portion of Fig. 17 showing relative cooperating parts in their operated position.

Fig. 19 is a part sectional view taken along the line and in the direction of the arrows 19—19 of Fig. 10, illustrating the mechanism for inserting a grip ring into a conveyor disc.

Fig. 20 is an end elevation of the portion of the machine shown in Fig. 19.

Fig. 21 is a view of a portion of the machine, partly in section, showing the power drive of the bar and separator aligning mechanism.

*General functions*

Figure 3:
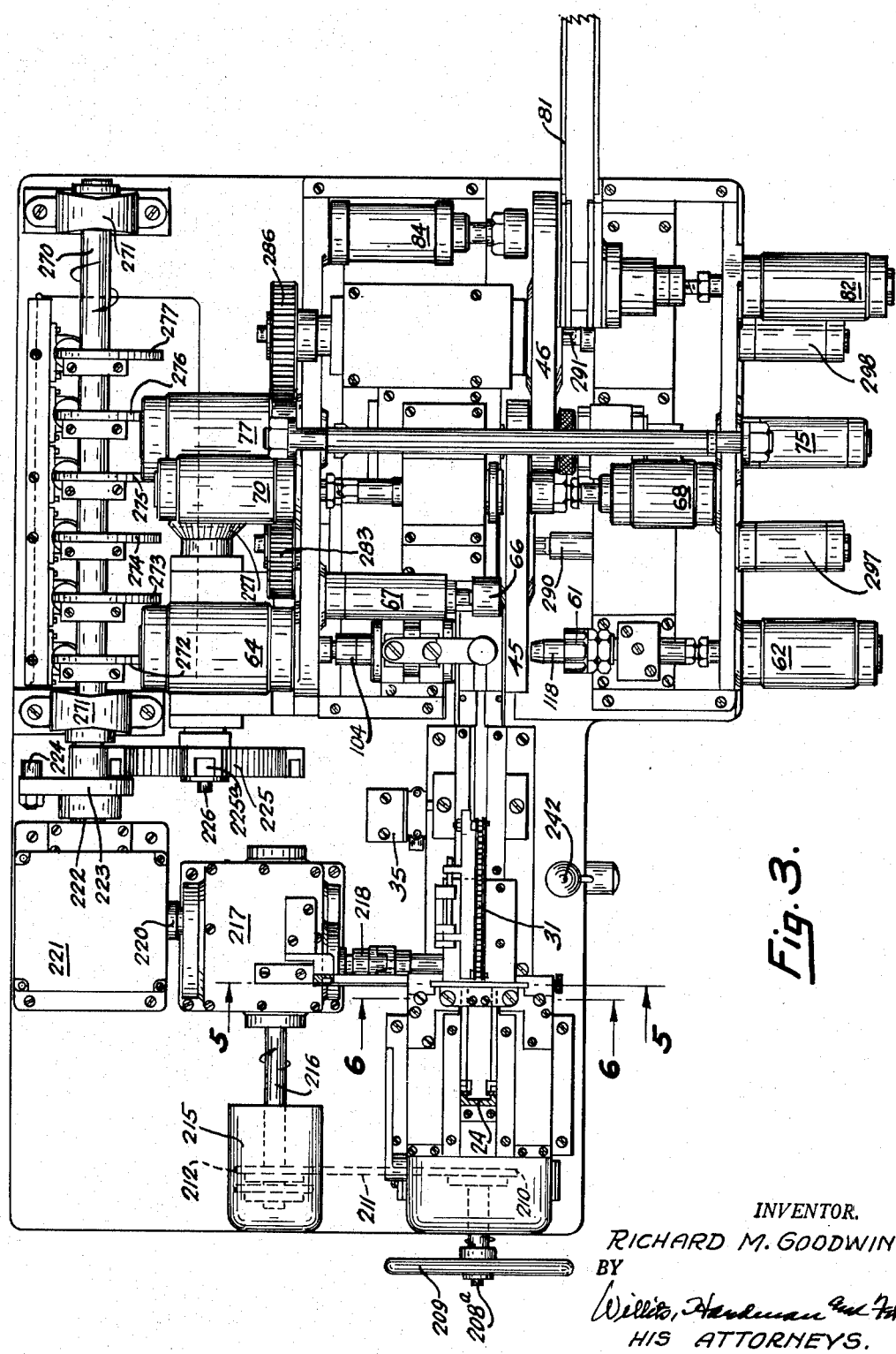
Fig. 3 is a plan view of the machine.
Figure 4:
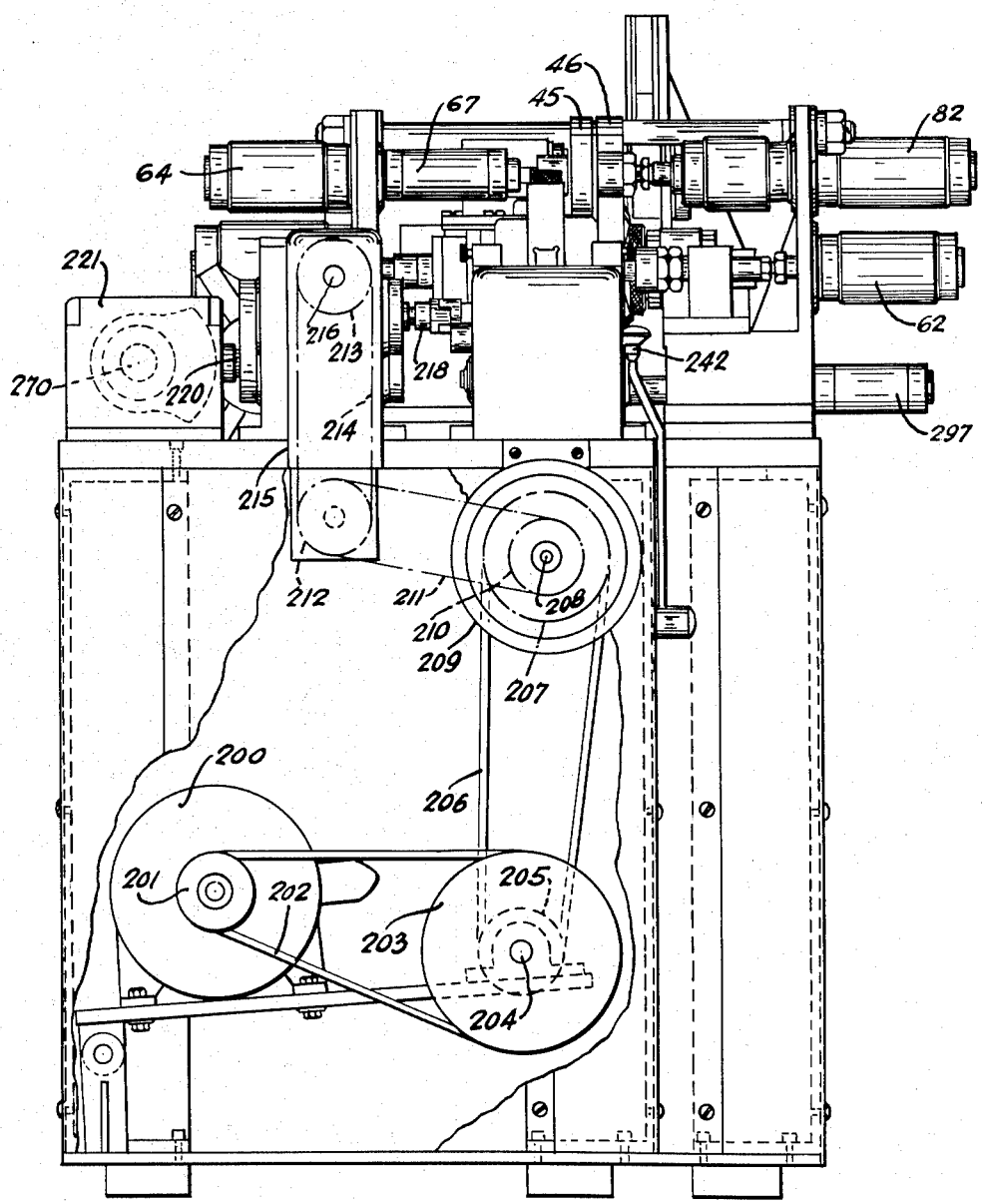
Fig. 4 is a view of the machine in end elevation, a portion of the machine casing being broken away to show the power drive of the machine.

The machine of the present invention is designed to assemble a predetermined number of alternate metal commutator bars and insulating separator segments into an annulus and place said annulus into a gripping work ring. This work ring is then adapted to be placed into another machine for the purpose of performing further operations necessary for the completion of the commutator. Several operations are performed by this machine between the time the metal and insulating segments are introduced into the machine and the annulus containing work ring is ejected from the machine. All operations occur at timed intervals and in recurrent sequence. For a general description of the operations of this machine reference will be made to the schematic views Figs. 1 and 2.

The metal segments 20 are introduced from a hopper into a vertical chute 21 through which the segments slide, with end to end contact and by force of gravity, so that the leading segment is pushed into a fixed position adjacent the entrance of a conveyor track 22. In a similar manner the insulating separators 23 are fed from a vertical chute or magazine 24, the stack moving by force of gravity so that the leading separator is pushed into a position above and directly behind the located, leading metal bar. A shifter slide 25 is operative to engage and push the leading separator from the stack into a position directly behind the leading metal segment. This slide 25 is positively actuated in one direction by a cam 26 while a spring 27 moves the slide to engage and push the separator from the stack into the bar engaging position. Thus the cam tensions the spring which in turn operates the separator pusher.

Working in timed relation to the cam 26 is another cam 28 which actuates a pusher 29 in one direction. Spring 30 actuates the pusher 29 to engage and transfer the engaging and located metal bar and insulating separator segments onto the conveyor track. This operation is continuous so that a line of alternately engaging metal bars and insulating segments are assembled and pushed forwardly on track 22. A chain conveyor 31 passing over sprockets 32, 33 and 34, one of which is a driving sprocket, has a finger 35, which during each circuit of conveyor movement, engages the trailing separator in the line on the track and moves said line of alternate bars and separators forwardly on the track. The length of the chain conveyor and the speed of its movement results in the finger 35 picking up and moving forwardly a predetermined number of bars and separators. The relative timing of the cam 28 and chain 31 is such that finger 35 of the chain will engage and start to push the trailing separator in the line forwardly on the track at a time when cam 28 is moving pusher 29 rearwardly or in a direction away from the track so as to provide clearance for the conveyor finger 35.

The sprocket 34 which is an idling sprocket, is spring urged to take up slack and constantly maintains the chain operatively taut. If, for any reason, derangement of the segments on the track should impede or prevent their movement on the track then the sprocket 34 would be moved by the tightening of this portion of the chain conveyor. This movement of sprocket 34 is utilized to actuate a machine stopping device which is necessary in case of jamming of the row of alternate bars and separators as they move along the track 22. The machine is driven by an electric motor as will later be described. In circuit with the electric motor is a switch 35a which is normally closed and which lies in the path of movement of the sprocket mechanism 34. As long as the spring loaded sprocket 34 is in normal chain tightening position this switch 35a is not engaged by the sprocket mechanism and thus remains closed to maintain its part of the motor circuit closed. However, if the sprocket 34 is actuated by the tightening of its engaged portion of the chain 31 due to jamming of the bar and separator line on the track, then an element associated with the sprocket 34 will be moved to engage an open switch 35a to break the motor circuit and thus stopping machine operation.

An annular track into which the line of alternate metal bars and insulating separators is introduced by movement of the chain finger 35 forwardly, is provided by a stationary block 40. The annular track therein is aligned with the stationary track 22 and thus, as the conveyor finger 35 moves the line of alternate bars and separators forwardly, they will enter into this annular track provided by stationary block 40 to form the assembled bars and separators into an annulus held within the stationary block 40.

The machine provides two rotatable disc conveyors 45 and 46 of similar size, superposed and arranged off center so that a portion of one disc overlaps and is contiguous to a similar portion of the other. These discs are rotated at the same speed and at the same time, Fig. 2 showing the disc 45 rotating in clockwise direction while the disc 46 rotates counterclockwise. Both discs are provided with six transverse holes equally spaced one from the other in an annular row concentric of the respective disc. Fig. 2 shows the hole 47 of disc 45 to be in alignment with the annular track in block 40 while the diametrically opposite hole 50 of said disc is in coaxial alignment with the hole 55 of the disc 46. Both discs 45 and 46 are rotated intermittently at properly timed recurrent intervals for a distance equal to the distance between adjacent holes therein. Thus, upon the next operation of the discs 45 and 46 hole 48 of disc 45 will align with the annular chamber in block 40 and hole 51 of disc 45 will align with the hole 56 of the disc 46, successive holes of the two discs being aligned in a similar manner as the discs 45 and 46 are recurrently rotated.

After the hole 47 of the disc 45 has been moved into coaxial alignment with the annular track in block 40, discs 45 and 46 are held stationary and means are then rendered effective to transfer the assembled annulus of alternate bars and separators from the block 40 into a ring in the opening 47, each opening in disc 45 being provided with an irremovable ring so mounted in the disc that it is capable of movement therein radially to provide for self alignment. These rings may be termed "constricting rings" inasmuch as they force the respective bars and separators of the annulus into more intimate engagement than that which exists in the block 40.

On one side of disc 45 and in coaxial alignment with the annular chamber in block 47 there is an abutment disc 61 normally spaced from the disc 45 but movable into engagement with said disc by a fluid pressure actuator 62. This actuator 62 is operative to move the abutment disc 61 into direct engagement with the disc 45, the abutment disc 61 having a disclike extension which is adapted to enter the opening of disc 45 at this station or more particularly aligning with the annular chamber 47 in block 40. On the opposite side of disc 45 and in coaxial alignment of the annular chamber 47 of block 40 there is provided a transfer plug 63, normally out of engagement with said block 47 but movable by a fluid pressure disc 64, to enter the block, engage the annulus therein and push said annulus from the block into the ring in disc 45. Both fluid pressure devices 62 and 64 are operated substantially concurrently at a time when the disc 45 is locked against movement and is completely stationary. For purposes of this description this stage of operation in the machine may be referred to as station A. After the fluid pressure devices 62 and 64 have retracted their respective elements 61 and 63 so that they no longer engage the disc and block respectively the operating mechanism for the discs 45 and 46 again becomes effective to rotate the discs through an arc equal to the distance between the openings therein, whereby the hole 47 in disc 45, which now contains an annulus of alternate bars and separators, is moved to station B, the opening 48 in said disc 45, being moved into the station A to receive an annulus upon the following operation of the fluid pressure devices 62 and 64. At station B there is provided a plug 66 normally out of engagement with disc 45 but movable to enter the opening in disc 45 at this station by the fluid pressure actuated device 67. This pusher plug 66 is provided at this station for the purpose of ejecting the assembled annulus in disc 45 if the operator perceives that an improperly assembled annulus containing perhaps imperfect segments or not sufficient segments may be ejected before moving further through the machine. Because this operation is not always necessary the fluid pressure device 67 is selectively operative by the machine attendant and is not automatically rendered operative at recurrent timed intervals as are the devices 62 and 64, or all of the other similar devices to be referred to hereinafter. It will, of course, be understood that when hole 47 of disc 45 is at station A, hole 55 of disc 46 is at station A' and likewise when hole 47 is moved to station B hole 55 will be moved concurrently to the station B' of disc 46.

In response to the next movement of the discs 45 and 46 in their respective directions hole 47 will be moved from station B to station C while hole 55 will be moved from station B' to station C' of disc 46. At station C disc 45 has a fluid pressure actuated member on opposite sides thereof and in coaxial alignment with the opening of the disc at this station. On the one side of the disc 45 a fluid pressure actuator element 68 is operative to move an abutment plunger 69 into engagement with this side of the disc 45 in order to close the opening in the disc 45 at this station. On the opposite side of the disc the fluid pressure actuated device 70 is operative to move elements 71 and 72. Element 71 is in the form of a plug adapted to enter into the central opening of the assembled annulus in hole 47 now at station C, this element 71 having longitudinal grooves spaced so that each groove will receive the inner edge of an insulating separator which extends radially toward the center of the annulus slightly beyond the adjacent surfaces of the metal bars. The abutment element 72 adjacent element 71 is shaped to engage the outer edges of the annulus and thus align the respective bars and separators at their one end, the grooved member 71 aligning the respective bars and separators radially and also longitudinally inasmuch as each separator inner edge enters into and is engaged by a respective slot in the element 71. After the annulus has been properly aligned at this station, pressure actuated devices 68 and 70 move their respective elements outwardly of the disc 45, which is then ready again to be rotated in order to bring the opening 47 into coaxial alignment with the opening in disc 46 at station A'. During this time hole 55 of disc 46 has been moved to the station D'.

At the station A' of disc 46 hole 47 of disc 45 is in coaxial alignment with the hole 58 of disc 46, both holes 47 and 58 having been moved into this station A' by the previous intermittent operations of the discs. At this station a pressure actuated device 75 is operative to move abutment disc 76 out of normal position into a position in which said abutment 76 engages disc 46 and closes the aligned opening therein which in this instance would be opening 58. Diametrically opposite there is provided a pressure actuated device 77 which moves elements 78 and 79 toward the disc 45 so that element 79, which is substantially like element 71, enters and engages the inner surface of the annulus within the opening 47 at this station A'. Operation of element 78 by the device 77 causes said element to engage the adjacent edge of the annulus in opening 47 and transfer said annulus from said disc 45 to disc 46. Each hole in disc 46 has an annulus gripping working ring inserted therein at the station E'. These rings, designated by the numeral 80, roll down a conveyor which is adapted to locate and hold the leading ring in coaxial alignment with the opening in disc 46 at this station E'. At this station a pressure actuated device 82 moves a pusher plug 83 into engagement with the leading ring on the conveyor 81 to push said ring into the aligned opening in disc 46. As the disc 46 rotates counterclockwise this ring containing opening is first moved to station F' and then to station A' where the ring containing hole aligns with the annulus containing hole in disc 45 for the purpose of receiving the annulus in said disc 45. Thus, the annulus in disc hole 47 when in the station A' of disc 46 will have its annulus transferred from disc 45 into the gripping work ring 80 in the opening 58 of the disc 46 aligned with opening 47 of disc 45. Upon retraction of the transfer pusher 83 by device 82 the discs 45 and 46 are again rotated in their respective directions. An annulus in the work ring of opening 58 is moved from station A' to station B', then station C' and finally at station D', is ejected from the disc 46. A pressure actuated device 84 actuates an ejection plug 85 so that it will engage the annulus containing work ring in opening 58 at station D' and push said annulus containing grip ring or work ring from the disc 46 onto a conveyor 86 which directs the work ring to any desirable location.

The general description of the operation of the machine, the chief elements for performing said operations and the manner in which they are performed having been described a more detailed description of the machine will now be presented.

The feeding mechanism for delivering alternate metal bars and separator segments into a location adjacent the entrance to a track 22, the pusher mechanism for pushing said segments onto the track, the conveyor for moving the assembled segments forwardly along the track and the block 40 providing the annular track aligning with the stationary track 22 and adapted to receive the stacked, predetermined number of segments in order to assemble them into an annulus, is fully disclosed in the patent to Baker et al. 1,979,434 of November 6, 1934. For this reason only a brief description of this portion of the machine will be provided. As has been previously described, the metal bars 20 are held in end to end engagement in an upright chute and moved by force of gravity so that the leading metal bar is placed in a position directly in front of and adjacent to the entrance of the stationary track 22. Figures 5 and 6 show the mechanism for providing a single insulating separator and placing it in engagement with the leading metal bar in its proper position. The shifter slide 25 is cam actuated into its normal position so that it is positioned above the leading separator bar in the chute 24. When the cam 26 is actuated to permit movement of the shifter slide 25 toward the leading separator, springs 27 will move said shifter slide downwardly to engage the leading separator segment and push it downwardly behind the located leading metal bar. Having delivered the leading separator segment to its position adjacent the leading metal bar the shifter slide 25 is again moved into normal position by the cam 26 against the opposing efforts of the springs 27. Now the pusher 29 is rendered movable out of its normal position by the operation of cam 28 permitting spring 30 to become effective to urge said pusher 29 forwardly to engage the metal bar segment and its contiguous separator and push both the bar and separator forwardly onto the track 22. Repeated operations will move pairs of segment bars and separators forwardly on the track and assemble a line of alternately engaging bars and separators on said track. During this time the conveyor chain 31 clearly shown in Fig. 7 is moved clockwise as regards this figure, this chain being provided with a finger 35 which, when a predetermined number of bars and segments have been assembled on the track 22, is timed to engage the trailing separator to move the row of predetermined number of separators and bars forwardly on the track toward the block 40 which provides the annular track in hole 47 of said block. This chain conveyor 31 is driven by a sprocket 32 and passes over a similar sprocket 33 and a slack take-up sprocket 34 which is yieldably urged by springs 34a in the direction to take up the slack in the chain. A section of a drag chain 31a is supported by the stationary track 22 in any suitable manner and is adapted to ride upon the upper surfaces of the bars and separators in said track 22 in order to hold them in proper position and to offer suitable impedance to their movement forwardly by the chain finger 35.

With special reference to Figs. 7, 8, 9, 13 and 14 block 40 is shown having an annular hole 47 therein, said block having a channel 100 communicating tangentially with the opening 47. On opposite sides of this channel there are provided spring fingers 101 which extend partially into the opening 47. As the row of alternate bars and separators are pushed along the track 22 they enter the channel 100 of block 40 and pass beneath the spring fingers 101 which engage the adjacent surfaces at opposite ends of the segments. In order to form a ring-shaped chamber within the opening 47 a plug 102 extends coaxially into said opening 47 to form the said ring-shaped chamber 103 in said block 40. Plug 102 slidably supports a sleeve member 104 which is connected with the pressure actuated element or device 64 in such a manner that said sleeve may be moved axially by said device 64 but may be rotated relatively thereto. A stationary supporting assembly 105 is secured to the stationary block by means of adjustable screws or bolts 106 this supporting assembly carrying two spaced blocks which provide a space 107 about the shiftable sleeve 104, said space being occupied by a collar 108 rigidly secured to the plug 102 by screws 109 whereby said plug is rotatably supported but immovable longitudinally relatively to the stationary supporting assembly 105. Sleeve 104 is slidably supported within the stationary supporting assembly 105 and has an elongated slot 110 through which the screws 109 extend so that said sleeve 104 may slide longitudinally on the plug 102 into which said screws 109 extend. Normally the sleeve 104 extends only partially into the opening 47 in block 40 while the plug 102 in said sleeve extends a greater distance into the opening 47. This provides the annular, ring-shaped chamber 103 within the block 40 or more particularly the ring-shaped track into which the row of segments is pushed to form said row into an annulus conforming to the chamber 103. A spring loaded trigger 112 is hingedly supported within a longitudinal recess at the inner end of the plug 102, said trigger normally extending into the path of movement of the segmental row as it is pushed into the annular track in block 40. As the segmental row is pushed into annular space providing the annular track, with the finger 112 engaging the leading metal segment stub, shaft 102 will be rotated, providing a drag to the entrance movement of the segmental row. As soon as the row of alternate metal and separator segments approaches complete entry into the annular chamber in block 40, leading segments will engage, slide over and depress the spring fingers 101 extending into opening 47 in block 40 and thus these fingers will yieldably hold said segments in their proper position. It will clearly be seen that the finger 112, as shown in Fig. 9, still extends into the space between the leading and the trailing segmental elements in this annular row of segments.

As has previously been stated the station at which the block 40 is located in the machine is referred to as station A. At this station the pressure actuated device 64 is provided to move the sleeve 104 longitudinally of the plug 102 and, as has previously been mentioned, another pressure actuated device 62 adapted to actuate an abutment disc 61 is located on the opposite side of said block 40. It also has been previously stated that a rotatable disc conveyor 45 is provided in this machine which has a series of equally spaced transverse openings arranged in an annular row concentric of the disc, said openings successively being brought into alignment with the annular chamber in block 40 at properly timed, recurrent intervals. Fig. 10 is a side elevation of a portion of the machine showing the disc 45 supported by a stationary wall bracket 115 which also supports the cooperating second disc conveyor 46. These two disc conveyors as shown in Fig. 17 are mounted side by side and, as shown in Fig. 10, are centrally displaced so that a portion of one disc overlaps and is contiguous to a similar portion of the second disc.

At station A, which is the station at the block 40, the operating device 62 is provided which is oppositely disposed to and in coaxial alignment with pressure actuated device 64. This pressure actuated device 62 have an axially movable plunger 116 slidably supported in a stationary standard 117 and provided with an abutment disc or head 61 from which a rodlike member 118 coaxially extends. When in normal position, pressure actuated device 62 maintains the abutment disc 61 and its rodlike extension 118 in spaced relation with the disc 45 so that said disc may be rotated. However, as has been stated previously, pressure actuated devices 62 and 64 are rendered active substantially concurrently and thus when the pressure actuated device 62 is rendered active it will move its rod 116 axially so that the abutment head or disc 61 on said rod is moved into engagement with the irremovable constricting ring 119 provided in all of the openings in the disc 45. When constricting ring 119 is engaged and has its one end closed by the abutment or disc 61 the rodlike extension 118 on said head extends coaxially through the ring and into the annular chamber in block 40 so as to be adjacent the end of the stub shaft 102 permanently extending into said opening 47 of the block 40. Substantially concurrently with the movement of the abutment disc extension 118 into the ring 119 in the opening of the disc 45, the pressure actuated device 64 moves the sleeve 104 longitudinally on the stub shaft 102 so that the end of said sleeve 104, shaped to conform to and engage the adjacent edges of the segments in the annulus, pushing said annulus from the annular chamber toward the ring 119 in the disc conveyor 45. As the sleeve 104 moves on the stub shaft 102 its end engages a sloping surface on the spring loaded trigger 112 and moves it inwardly in the slot in stub shaft 102 thereby retracting said trigger from between the adjacent and spaced segment portions which were the leading and trailing segment portions as the row of segments were being pushed into the annular chamber in block 40. As shown in Fig. 13, the opening 47 in block 40 is tapered inwardly at its end adjacent the disc conveyor 45 and the constricting ring 119 has its adjacent end tapered inwardly so that as the assembled annulus of the segments is being pushed from the annular chamber in block 40 by the sleeve 104, said segmental annulus is squeezed together so that eventually the two spaced segment portions of metal and insulation respectively are moved into contact and thus the annulus is rendered continuous and the space, as shown in Fig. 9, originally occupied by the trigger 112 is thereby eliminated. The segmental annulus being moved from the stub shaft 102 by the sleeve 104 is transferred upon the rodlike extension 118 of the abutment head 61 concentrically extending into the constricting ring 119. This ring 119 grips the annulus transferred thereinto sufficiently so that it will remain in said ring 119 upon the withdrawal of the rodlike extension 118 when the pressure actuated device 62 retracts its rod 116 and therefore moves its abutment head 61 and the rodlike extension 118 away from disc 45 and in spaced relation thereto. At the same time the pressure actuated device 64 is rendered effective to withdraw the sleeve 104 from the projected position as shown in Fig. 14 in which the screw 109 is at the one extreme end of slot 110 in sleeve 104 moving said sleeve into the position as shown in Fig. 13 in which position screw 109 occupies the slot 110 at its opposite end and in which position the trigger 112 is again spring actuated to extend from the stub shaft 102, in which it is hingedly supported, into the annular chamber 103 preparatory to receiving the next assembled row of metal and insulating segments. Fig. 14 clearly shows the segmental annulus consisting of metal bars 20 and insulator separators 23 alternately engaged, completely transferred into the connector ring 119 in the aligned hole of disc 45.

At the next rotational movement of disc 45 for a distance equal to the spacing of the openings therein the annulus containing ring 119 in the hole of the disc at station A, which is the station adjacent the block 40, will be moved to the station B indicated in the diagrammatic Fig. 2. At the same time the hole in the disc 45 next adjacent to the hole previously aligned with the block will be moved into coaxial alignment with said block and the aforedescribed operation will be repeated thereby transferring the assembled annulus from the block 40 into the constrictor ring in this hole. Thus as the disc 45 rotates clockwise as shown in Fig. 2 and as the successive holes are moved into alignment with said block they will have a segmental assembled annulus transferred into their respective rings.

At the station B no automatic operation on the assembled annulus in the constrictor ring in disc 45 takes place. However, at this station B there is provided a pressure actuated device 67 normally holding a pusher plug 66 in spaced relation to the disc 45 this pressure actuated device 67 being selectively operative by the machine attendant for introducing the pusher plug 66 into the aligned disc 45 for the purpose of ejecting the assembled segmental annulus therein if the operator finds that said segmental annulus contains imperfect segments or segments assembled in a manner not capable of producing a passable assembly at the end of the complete machine operation. It will be noted that this pressure actuated device 67 is not automatically brought into effect as are all of the remaining pressure actuated devices associated with this machine and as will later be described, this particular device 67 being brought into effect only when disc 45 is stationary by the manual operation of any suitable control device at the will of the attendant.

Upon the rotation of disc 45 through its next predetermined range of movement clockwise the annulus containing opening in said disc 45 will be moved into station C as indicated in Fig. 2. At this station the radial and longitudinal alignment of the alternate metal bars and insulating segments is performed. The metal bars and segments are of the same configuration having a body with inwardly extending dovetail portions. The insulating separators are just a bit wider from their outer to their inner edges than the metal bars so that the separators extend slightly beyond the confines of the inner annular surfaces formed by the metal bars. At the station C two diametrically opposite pressure actuated pushers are provided in coaxial alignment with the opening of the disc 45 at this station. The mechanism at this station including the two power actuated pushers is illustrated in Figs. 15 and 16. In Fig. 15 the disc 45 is shown having the holes at station C and its constrictor ring 119 containing an assembled annulus of alternate metal bars and insulator segmens 20 and 23 respectively. The pressure actuated device 68 has a plunger 125 adjustably carrying an abutment member 69 which has a central recess 126 in the end thereof adjacent the disc 45. When rendered active the disc 68 pushes the abutment member 69 into engagement with the end edges of the segmental annulus contained within the ring 119 at this station C. Substantially concurrently with the rendering of device 68 active the opposed device 70 is rendered active to push its rod 128 forwardly toward the disc 45. This rod 128 supports a shouldered sleeve 129 (referred to as plug 71 in the diagram Fig. 1) at its outer end, the outer peripheral surface of said shouldered sleeve, for a portion thereof adjacent the end of the sleeve, having spaced longitudinal slots 130 coinciding in number and spacing with the separator segments in the annulus within aligned ring 119, so that when the sleeve 129 is moved outwardly by the device 70 to enter into the assembled segmental annulus, the tapered ends of said slots 130 will each receive an inwardly extending end edge of a separator and as the slotted portion of sleeve 129 moves inwardly of the assembled annulus and being incapable of rotation relatively to the annulus said longitudinal slots 130 in said sleeve 129 will longitudinally align the separators and consequently properly align the interposed metal bars. The bottom of slots 130 in sleeve 129 engage the interior edges of the dovetail of the separators while the intermediate portion of the sleeve 129 between said slots engage the inner edges of the dovetail portion of the metal bars 20 of the assembled annulus and thus said separators and bars will be aligned radially due to the contact of said inner edges of the assembled annulus by the sleeve 129 which is rigid and of predetermined outer dimensions. The sleeve 129 slidably supports an outer sleeve 132 which has an inwardly extending annular flange 132a engageable with the shoulder on the sleeve 129 whereby sleeve 132 (referred to as an abutment element 72 in Fig. 1) is normally held so that its outer end edge is substantially in alignment with the outer end edge of sleeve 129. Slidably supporting said sleeve 132 is a stationary element 133 having spring loaded plungers 134 engaging an annular flange 135 on the sliding sleeve 132 and substantially exerting a pushing effort upon said sleeve 132 to force it toward the disc 45. However, movement of sliding sleeve 132 under the effect of the spring pressed plungers 134 is normally prevented due to the engagement of the inwardly extending annular flange 132a on sleeve 132 with the annular shoulder on sleeve 129 and thus as long as sleeve 129 is held in the retracted position by the power-actuated shaft 128 sleeve 135 can not be moved by its spring loaded plungers 134. However, as the pressure actuated device 70 moves its rod 128 outwardly sleeve 129 will move with said rod toward the disc 45 and consequently spring loaded plungers 134 may then move the sleeve 132 to follow the movement of sleeve 129 until the outer end edge of the sleeve 132 engages the adjacent outer peripheral edge of the assembled annulus within ring 119 said spring loaded plungers 134 then exerting a pushing effort upon the sleeve 132 to align the engaged end edges of the alternate metal bars 20 and insulator segments 23 in the assembled annulus. The sleeve 129 as it is moved through the assembled annulus in the ring 119 will partially enter the recess 126 in the abutment head 69, as shown in Fig. 16. As soon as the aligned operation is completed by the movement of the plunger 128 and its sleeve 129 from its position as shown in Fig. 15 into the position as shown in Fig. 16 control mechanism for the pressure actuated devices 68 and 70 respectively will be rendered effective to cause said devices again to withdraw their respective rods or shafts so that the elements associated therewith are moved out of engagement and into spaced relation with the disc 45 to permit its rotation for the next operation. While the pressure actuated element 70 retracts the sleeve 129 from the annulus in ring 119, the abutment disc or member 135 is maintained in engagement with the end edges of the segments in said annulus under the effect of the springs 134a thereby preventing displacement of said segments which might occur during the withdrawal of the sleeve portion 129 from the annulus within the ring 119. As soon as the sleeve portion 129 is withdrawn from the annulus the shoulder thereon will engage the inwardly extending flange 132a on the abutment member 132 and thus will cause the said abutment to be moved retractively with the rod 128 so as to space the entire mechanism from the disc conveyor 45 to permit its rotation for the next operation.

As previously described and as illustrated in Figs. 1, 2, 10 and 17, discs 45 and 46 are placed side by side and are centrally displaced so that one portion of the disc 45 overlaps and is contiguous to a similar portion of disc 46. Both discs being rotated at the same speed and being provided with the same number of transverse openings arranged in an annular row equally spaced from the axis of the respective discs render the respective holes of the respective discs coaxially alignable at the station A' of the disc 46 which is the station at the area of overlapping of said disc. At this station the operation of transferring the assembled annulus from disc 45 to disc 46 is performed. Each opening in disc 46 has a gripping work ring inserted therein at the station E', as illustrated by Figs. 2, 19 and 20, which is the second station from station A' in a direction opposite the rotative direction of disc 46. In this machine disc 45 is rotated clockwise and disc 46 counterclockwise. At the station E' there is provided a conveyor 81 which directs gripping work rings 80 to a location so that the leading work ring on said conveyor coaxially aligns with the openings in disc 46 currently at this station. A pressure actuated device 82 providing a pusher plug or plunger 83 in coaxial alignment with the leading work ring 80 on the conveyor 81 is automatically rendered effective at the proper time to push said work ring into the hole in disc 46 aligned with said work ring at station E'.

Fig. 19 shows the mechanism for pushing the work ring into the aligned hole of disc 46. The pressure actuated device 82 has a shaft 182 reciprocative thereby, said shaft supporting the pusher plug 83 which is adapted to enter the work ring 80 to be inserted so as to guide it into the aligned hole of the disc 46. Upon this pusher plug there is mounted a collar 183 having a sliding lost motion endwise of said plug whereby when the plug is moved forwardly and enters the work ring, collar 183 will engage the adjacent edge of the work ring and push it into the aligned opening of disc 46. As its plug 83 is retracted from the inserted work ring it moves relatively to the collar 183 a certain distance then picks up said collar and moves it out of the way of the conveyor so that the next adjacent work ring on the conveyor may roll into proper location coaxially of the aligned hole in disc 46 for insertion purposes. Thus as the disc 46 is rotated counterclockwise this ring containing opening in said disc is first moved to station F' where no operation is performed and then to the station A' where the transfer of the annulus in disc 45 is completed to the ring in disc 46.

Figs. 17 and 18 illustrate the mechanism for effecting this transfer. Pressure actuated device 75 has a rod 150 reciprocative by said device, this rod supporting an abutment disc 76 in a manner so that said abutment disc is adjustable longitudinally of the rod. Normally the device 75 holds the abutment disc or member 76 spaced from the disc conveyor 46. However, when the device 75 is rendered active it moves the abutment disc or member 76 into engagement with the gripping work ring 80 in the aligned opening of the disc conveyor 46. The end of the abutment disc 76 engaging the work ring is recessed as at 151. The split clamping rings in dial 46 indicated as 152 are used to hold the rings 80 in the dial or disc 46 so that the rings 80 will not fall out of the dial as the dial indexes. They will also permit the rings 80 to expand and receive the bars and insulators at the transfer position or operation.

In Fig. 17 the mechanism for transferring the annulus from the disc conveyor 45 to the disc conveyor 46 is illustrated as comprising a pressure actuated device 77 having a rod 78 reciprocative thereby, said rod having the member 161 adjustably attached thereto. This member 161 has an end extension 162 of reduced diameter upon which a nose 155, in the form of a collar, is rotatably secured so that said nose is reciprocative with the shaft or rod 78 and rotatable relative thereto. Between the nose 155 and the shoulder formed by the reduced shaft portion 162 there is provided a thrust bearing 156 which permits rotation of the nose 155 on the shaft portion 162 while end thrust is being exerted on said nose to force it into the aligned annulus in disc 45. An end portion of the peripheral surface of the nose collar 155 is longitudinally slotted, the size and spacing of said slots corresponding to the thickness and spacing of the dovetail edges of the separators extending beyond the inner surface of the dovetail portion of the metal segments in the annulus. The portion of the nose collar 155 between the slots engages the inner edge of the dovetail portion of the metal bars in the annulus and thus as the nose collar 155 is pushed into the annulus the slotted end thereof will maintain the alternate metal and separator segments in proper alignment and relative positions. As the nose collar 155 is pushed into the annulus a proper distance so that it extends completely therethrough, the abutment ring 163 on said collar will engage the adjacent edge of the assembled annulus and continued movement of the rod 78 under the effect of the pressure actuated device 77 will push said annulus from the ring 119 in the conveyor disc 45 into the grip work ring 80 contained within the opening of disc 46 aligning with the said nose collar 155 and its shaft 78. The portion of the nose collar 155 extending beyond the assembled annulus will enter the recess 151 provided in the abutment disc or member 76 which as has been said, is held in engagement with the side of the disc 46 opposite the side thereof entered by the transferred annulus.

The nose collar 155 has an outwardly extending annular flange 164 adjacent its point of contact with the end thrust bearing 156, said outwardly extending flange being normally engaged by an annular shoulder provided on the member 165 which is slidable on the shaft 78 and also slidably supported within a stationary supporting housing 169. This member 165 has a recess into which the head end of the rod 170 extends. This rod seated in the member 165 slidably extends through an opening in member 161 attached to the shaft 78. A plurality of these rods 170 are arranged to seat in the annular member 165 which, as has been previously stated, is slidably supported within the stationary housing 169 and slidably engages the rod or shaft 78. Each rod 170 is surrounded by a spring 171, one end of which abuts against a flange on the pin engaging the member 165, the other abutting against the member 161.

These springs normally yieldably urge the member 165 so that an inner annular shoulder therein abuts against the outwardly extending annular flange 164 on the nose collar 155. As the shaft 78 and its attached member 161 are moved toward the disc 45 by the pressure actuated element 77 the springs 171 will cause the member 165 to move along with the shaft, said member 165 having the cylindrical extension 172 which surrounds the nose collar 155 the outer edges of said cylindrical extension and the nose collar being normally in substantial alignment. As the shaft 78 and the nose collar 155 are moved forwardly toward the disc 45 the collar 155 will enter the annulus in the disc 45 and the outer edge of the cylindrical extension 172 will engage the adjacent end edge of the annulus in which the nose collar 155 enters. Continued movement of the shaft 78 moves the nose collar 155 through the annulus until the abutment collar 163 on said nose collar engages the annulus to transfer it from ring 119 in disc 45 to ring 80 in disc 46. The cylindrical extension 172 of the member 165 engaging the annulus as nose collar 155 begins to enter said annulus, will no longer be movable with the shaft 78 until the abutment ring 163 engages the annulus to transfer it and therefore the member 161, moving with the shaft, will compress springs 171 so that they will exert a pushing effort upon member 165 to maintain its extension 172 in engagement with the annulus during its transfer. Now when the pressure actuated device 77 is operated to retract its shaft and attached nose collar 155, said nose collar will be withdrawn from the annulus now contained within the gripping work ring 80 in the disc conveyor 46. Retraction of the nose collar 155 from the annulus in the gripping ring 80 will not in any way move said annulus with it for, while said nose collar 155 is being withdrawn from the annulus in the gripping ring 80, the cylindrical extension 172 engaging the end edge of the annulus will under the effect of springs 171 hold said annulus against any displacement effect by the withdrawing of nose collar 155. As soon as said nose collar 155 is withdrawn from the annulus in gripping ring 80, the annular flange 164 on said collar will engage the cooperating inwardly extending annular shoulder in the member 165 and thus the power actuated shaft 78 and its attached collar 155 will positively move the member 165 into its normal position in which its end edge aligns with the end edge of the nose collar 155 and both clear the conveyor disc 45 to permit rotation thereof for the next operation. While the pressure actuated device 77 retracts the nose collar 155 the pressure actuated device 75 will move the abutment member or disc 76 out of contact with the gripping collar 80 in the disc 46 and clear of said disc so as to permit its rotation for the following operation.

The annulus having been transferred from disc 45 to disc 46 at station A', the next rotative movement of disc 46 counterclockwise will move this annulus containing hole of said disc 46 to the station B' where no operation occurs the next following rotation of disc 46 counterclockwise moving said annulus containing hole to the station C' where no operation is performed. The next rotative movement of disc 46 counterclockwise moves the annulus containing hole from station C' to station D' where the annulus containing, gripping working-ring held in the hole of the disc 46 is ejected from the machine. A conveyor 86 is provided in proper alignment with the hole at this station. On the side of the disc 46 opposite the conveyor disc 45 and aligned with the annulus containing hole in disc 46 at this station D' is an ejector plug 85 reciprocated by the power actuated device 84. Substantially concurrently with the operation of the other automatically controlled power actuated devices, device 84 is rendered active to move the ejector plug or plunger 85 into engagement with the work ring in the hole of disc 46 aligned with said ejector plug 85, said plug pushing the annulus containing work ring from the disc 46 onto the conveyor 86 by means of which the annulus gripping work ring is conveyed to any suitable location. From the aforegoing it may be seen that at the station A associated with disc 45 the assembled annulus in block 40 is transferred from said block into a constricting ring irremovably secured but in a self aligning manner in the hole of the disc 45 aligning with the block 40 at station A. When the disc 45 is rotated clockwise this annulus containing hole in disc 45 is moved to the advanced station B while the trailing hole 48 of said disc 45 is moved into the station A. At the next rotation of disc 45 the holes are advanced to the next adjacent station the annulus containing hole being moved from station B to station C while another empty hole is moved into the alignment with block 40. The next rotation of disc 45 moves the annulus containing hole at station C to station A' of disc 46 where this annulus containing hole of disc 45 coaxially aligns with a corresponding hole in the disc 46 to effect transfer of the annulus from disc 45 to disc 46. These movements of a hole from one station to another are effected by intermittent rotation of the conveyor discs 45 and 46 through an arc of movement equal to the annular relation between the adjacent holes in the respective discs. While the discs are being rotated the means for rendering the various pressure actuated devices are ineffective to render said devices active. When the driving means of the two disc conveyors is inactive and the two discs are stationary, power-actuated elements are rendered effective lockingly to engage said disc to prevent any rotation of them for, while said discs are stationary, the various power-actuated pushers and abutment members are activated to enter the holes of the respective discs for performing their respective operations. As soon as the power-actuated pushers or plungers have completed their cycle of operation and have moved their respective parts into normal position in which they are disengaged and spaced from the respective discs then the power-actuated means for locking the discs against rotation is again rendered active to unlock the discs permitting their driving means to become effective to rotate the discs through the next succeeding arc of rotation.

*Power driven mechanism*

Referring particularly to Figs. 3, 4, 12 and 21, the machine is shown equipped with a main driving electric motor 200 upon the shaft of which is secured a driving pulley 201 connected by a belt 202 with a pulley 203 mounted upon shaft 204. Another pulley 205, of reduced size, is attached to shaft 204 and through a belt 206 drives a pulley 207 secured to the shaft 208. One end of shaft 208a extends to the exterior, which is a shaft connectible with shaft 208 through a clutch, of the machine and has a hand wheel 209 secured thereto which may be used to operate the machine when adjustments are to be made therein. A chain sprocket 210 is attached to shaft 208a and has a chain 211 thereon which drives the sprocket 212 in turn connected with a sprocket 213 by a chain 214. Sprockets 212 and 213 with their connecting chain 214 are contained within a housing 215. Sprocket 213 is mounted upon a shaft 216 which extends from housing 215 into a gear housing 217 in which suitable speed reducing gearing is provided driven by the shaft 216. From housing 217 there extends a shaft 218 which is operatively connected to the sprocket 32 which drives the conveyor chain 31. Another shaft 220 extends from the chain speed gearing housing 217 into the gearing housing 221. The gearing within housing 221, not shown but of suitable standard construction, drives a shaft 222 extending from the housing 221 and upon which the Geneva gear actuating member 223 is mounted. This Geneva gear actuating member 223 has an eccentric pin 224 which, once in every revolution, enters into and engages one of the six slots 225a in the Geneva gear 225 so that for each revolution of the Geneva gear driver 223, the Geneva gear 225 will be rotated through 60° of its complete revolution. The Geneva gear 225 is secured to a shaft 226 which, as shown in Fig. 12, also has a miter gear 227 attached thereto cooperatively meshing with another miter gear 228 mounted on shaft 229.

As previously stated belt driven pulley 207 is mounted upon a shaft 208 which is connectible with shaft 208a at the end of which a handwheel 209 is secured. As shown in Fig. 21, this shaft 208 may be connected with or disconnected from shaft 208a by means of any suitable clutch mechanism 240. For purposes of engaging and disengaging said clutch 240 there is provided a yoke collar 241 operatively connected with a shift lever 242 which, when in its central position, as shown in Fig. 1, maintains the collar 241 in its neutral position in which the clutch 240 is disengaged thereby disconnecting shafts 208 and 208a. Shaft portion 208a has a braking mechanism 243 of any suitable design which is normally released but which may be brought into effect to break machine operation and eventually hold it against operation when the shifter lever 242 is moved into the forward position as regards Fig. 21 in which the shifter collar 241 is moved into its brake-engaging position. The portion of the shaft 208a extending from the braking mechanism 243 has a bevel gear 250 attached thereto which operatively meshes with an associate bevel gear 251 mounted upon the shaft 252. This shaft has a disc 253 attached thereto to which the cam 26 is secured. This cam 26 has a predeterminately shaped camming edge 255 upon which a roller 256 rides, this roller or cam follower 256 being attached to a shaft 257 which is urged by springs 27 yieldably to hold the follower 256 upon the cam. As shown in Fig. 6, two shafts or pins 257 are provided urged by springs 27 to move the plate 25 downwardly for engaging the leading separator segment in the feed roll and moving said segment into a position contiguous to the leading metal segment both in position at the entrance of the track 22. The springs 27 are effective to move the plate 25 when the cam follower 256 transverses a lowering surface on the cam edge 255. However, when the follower 256 rides on a rising cam surface then the pins or shaft 257 are operated positively to lift the plate 25 into its normal position.

Supported on shaft 252 and attached to the cam 26 is another cam 28 which has a radial arm engaging a follower 261 supported upon a pin 262 attached to the metal bar pusher 29 also shown in Fig. 1. The pusher 29 has its one end secured to a link 263 which is also connected to a pivoted lever 264, the end of lever 264 opposite the link being provided with a follower 265 engaging one end of a plunger 266 loaded by spring 30 which yieldably urges the lever 264 clockwise as regards Fig. 21 to move the pusher 29 forwardly at which time the separator and its contiguous bar are moved from the location in front of track 22 on to said track. The pusher 29 is positively returned to its normal position as shown in Fig. 21 by the cam 28 against the opposing force of spring 30.

Referring particularly to Figs. 3, 11, 12 and 22, shaft 222 extending from the gear box 221 and having the Geneva gear actuator 223 secured thereto has shaft 270 keyed to it which shaft is supported rotatably in journal boxes 271 and has a series of cams 272, 273, 274, 275, 276 and 277 mounted thereupon so as to be rotated by said shaft 270. These cams actuate control valves 272a, 273a, 274a, 275a, 276a and 277a respectively in such a manner that they are opened and closed recurrently at timed intervals to render fluid pressure actuated devices active and inactive at properly timed intervals as will later be described.

Figure 11:
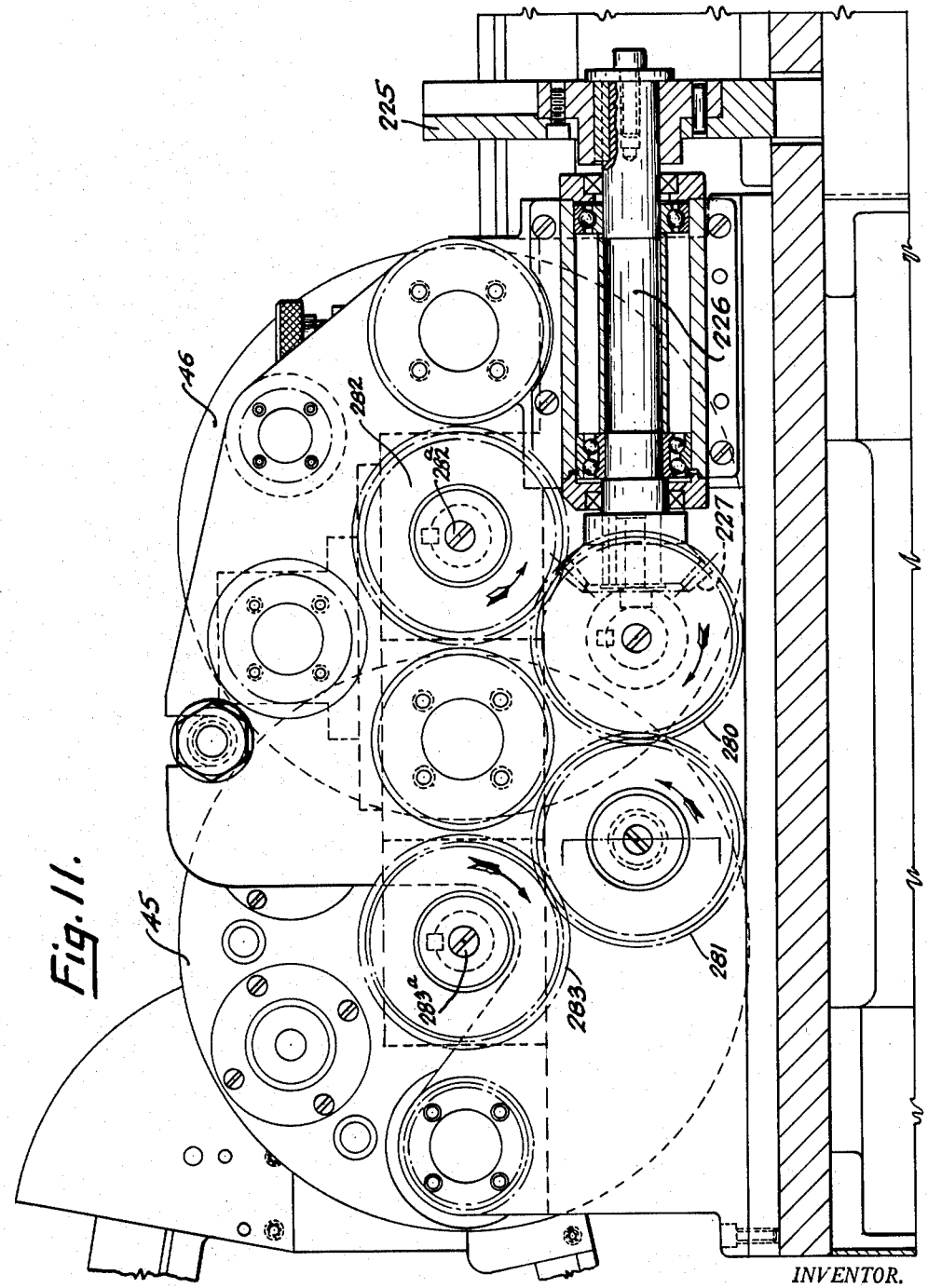
Fig. 11 is a fragmentary view with a portion in section illustrating driving mechanism for the two rotatable disc conveyors, the section being taken along the line and in the direction of the arrows 11—11 in Fig. 12.

The machine is provided with two rotatable conveying discs 45 and 46 arranged side by side and off center one relative to the other so that a segmental portion of one overlaps and is contiguous to a segmental portion of the other. Each disc as mentioned, has six holes equally spaced, one from the other in a circular row concentric of the respective discs. In order that each hole in each disc is moved into a certain station and held there for an interval of time for operational purposes intermittent driving mechanism is required. This intermittent driving mechanism is provided by the Geneva gear 225 which, as has previously been described, is intermittently engaged and rotated by actuator 223 through an arc of 60° movement at timed intervals. This Geneva gear is connected with a pinion 280 through beveled gear 227 and 228, said pinion meshing with an identical gear 231, both gears 280 and 281 being mounted on suitable stub shafts. Thus, as the Geneva gear is rotated pinion 280 will be rotated in one direction while its operatively engaging pinion 281 will be rotated in the opposite direction both rotating at the same speed. As shown in Fig. 11, pinion 280 rotates clockwise while its companion pinion 281 rotates counterclockwise. Pinion 280 operatively engages an identical pinion 282 secured to shaft 282a upon which disc conveyor 46 is operatively mounted. A similar gear 283 is operatively engaged by pinion 281 so as to be driven thereby, the shaft 283a upon which pinion 283 is mounted also having the disc conveyor 45 attached thereto. Thus, clockwise rotating pinion 280 will rotate its associated gear 282 and the conveyor 46 counterclockwise while the counterclockwise rotating pinion 281 will rotate its associated pinion 283 and the conveyor disc 45 clockwise. Each time the actuator 223 enters a slot in the Geneva gear 225 it will rotate the Geneva gear through an arc of movement of 60° and therefore through the connecting gearing conveyor discs 45 and 46 are likewise rotated through an arc of 60° of a complete revolution. This results in each one of the six holes of the conveyor disc 45 to be moved to the respective stations A, B, C and A' respectively at successive intervals while the holes in disc 46 are respectively moved and at timed intervals to the stations A', B', C', D', E' and F', as shown in Fig. 2.

Figure 22:
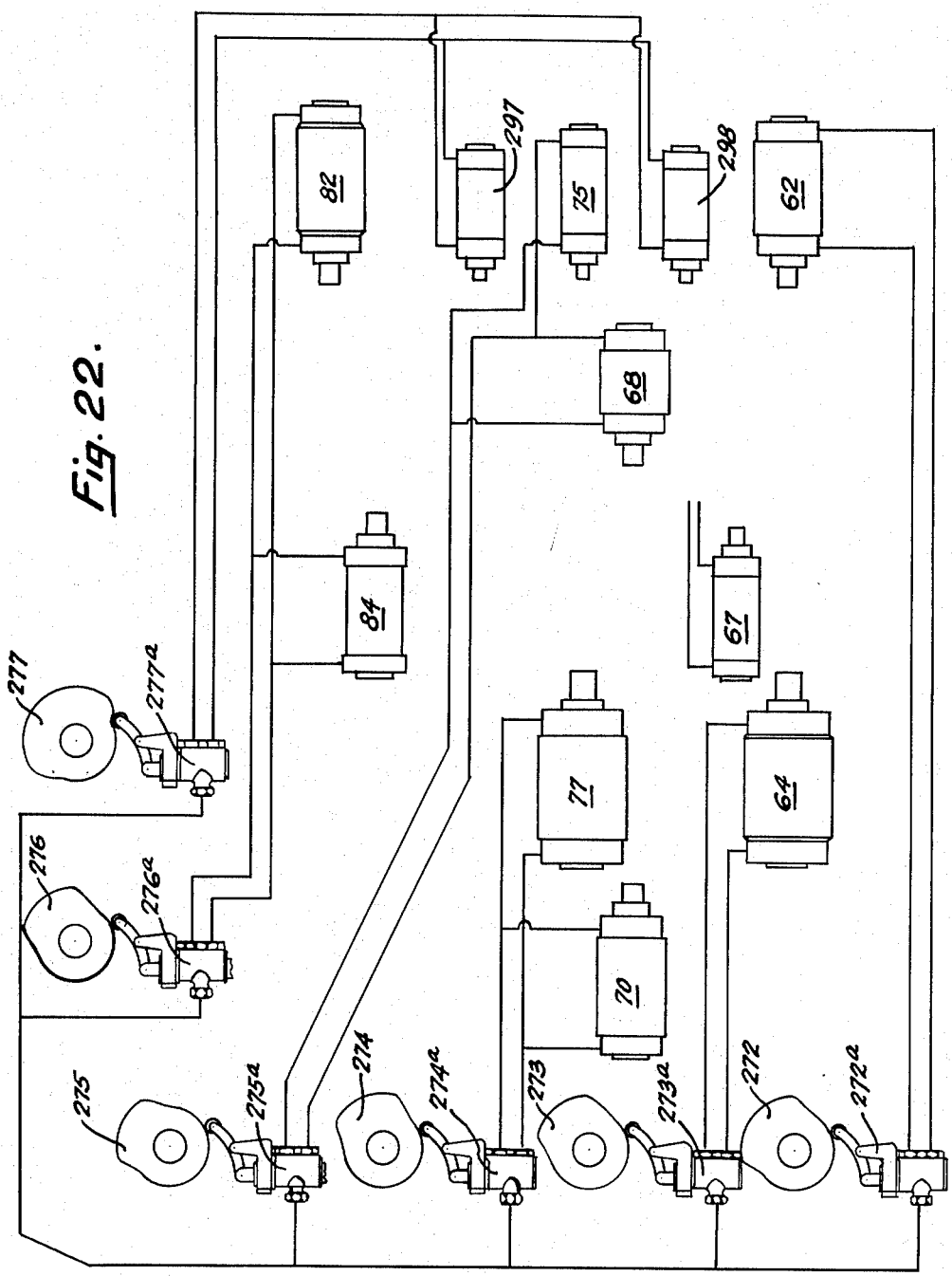
Fig. 22 is a diagrammatic view showing the several operating cylinders and their respective control devices.

While the conveyor discs 45 and 46 are stationary, which is at a time in which the Geneva gear 225 is not being rotated, they are locked against rotation by the insertion of locking pins 290 (see Fig. 3) engaging disc 45 and 291 engaging disc 46. These locking pins are moved to enter openings 292 in discs 45 and 293 in disc 46 respectively by the pressure actuated devices 297 and 298 rendered active at properly timed intervals. Other pressure actuated devices are also rendered active to perform their functions at timed intervals during the period in which the rotatable disc conveyors 45 and 46 are locked against movement. Figure 22 is a diagrammatic view showing these pressure actuated devices and their controlling mechanism. The cams 272 to 277 respectively mounted upon and rotated by the shaft 270, actuate associate controlling valves for rendering these pressure actuated devices active and inactive. In Fig. 22 it may be seen that these cams are effective substantially concurrently or at least while the discs 45 and 46 are locked against rotative movement. Cam 272 actuates the valve 272a to control the pressure actuated device 62 which is located at station A of disc 45 and operates an abutment member 61. Cam 273 controls the operation of valve 273a which renders the device 64, also at station A on the side of the disc 45 opposite the device 62, active and inactive for controlling operation of the member 63 which pushes the assembled annulus from the annular track in block 40 and transfer said annulus into said aligned hole of disc 45. Cam 274 actuates valve 274a to control the pressure actuated device 77 which is the one that operates the mechanism for transferring the assembled annulus in a hole in disc 45 to an aligned hole in the disc 46 at station A'. (See Figs. 1 and 2.) Cam 275 controls the operation of valve 275a which controls operation of the pressure actuated devices 68 and 75. Device 68 as shown in Fig. 1 operates an abutment member 69 at the station C for the hole in disc 45 located at this station. Device 75 also actuates an abutment member 76 which is located on adjacent disc 46 at the station A'. Cam 276 operates valve 276a which also controls pressure actuated devices 82 and 84. As shown in Fig. 1 device 82 operates an abutment member 83 at the station E' of disc 46, this abutment member engaging and removing the leading work ring from a conveyor into the aligned hole of the disc 46. The device 84 in turn operates an abutment member 85 to engage the annulus assembled in the hole of the opening in disc 46 at station D' whereby the annulus containing work ring is discharged from the machine onto the conveyor 85. Cam 277 controls valve 277a for rendering the pressure actuated devices 297 and 298 active and inactive. These devices move the respective locking pins 290 and 291 into and out of locking engagement with the respective discs 45 and 46. It will be noted that the cam 277 has a much longer valve opening cam surface than any of the other associated cams showing that the devices 297 and 298 which lock the discs 45 and 46 against rotation are maintained active for a longer period of time than any of the other cam operated valves thereby assuring that the discs 45 and 46 are locked against operation while the other valves render the other pressure actuated devices active to perform their various functions. Fig. 22 shows the pressure actuated device 67 which is the one operative to move the plug 66 toward the disc 45 to eject the annulus in the hole aligning therewith is not machine operated but being operative by any suitable manually actuated valve whenever the attendant deems it necessary to eject the assembled annulus at station B of disc 45.

The electric switch 35a illustrated diagrammatically in Fig. 2 and in electrical circuit with the driving motor remains normally closed during proper operation of the machine. However, if for any reason jamming of the segments as they are being conveyed to the annular track in block 40 takes place, then the chain 31 will be stressed to move the slack takeup sprocket 34 against the effect of spring 34a to engage switch 35a and open it, thereby bringing standard solenoid controls into effect for causing the driving motor 200 of the machine to be rendered inactive. The action of the solenoid controls releases clutch 240 and concurrently renders the brake 243 active for quickly stopping the machine. Another automatic stopping device is provided consisting of elements 300 and 301 of an electric eye mechanism which is located along the conduit 21 conveying the gravity moving, end to end engaging metal bars to the entrance location of track 22. As long as a continuous supply of end to end engaging bars pass through the conduit 21 past the electrical eye mechanism 300—301 the ray remains interrupted and the electric motor 200 will continue to operate inasmuch as the electric eye mechanism is associated with any suitable electric circuit completion of which is necessary to render the electric motor 200 operative. However, when for any reason the metal bars jam or the supply ceases so that interruption of the beam between elements 300 and 301 would no longer exist then completion of this beam would render the electric motor 200 inoperative and through the aforementioned standard solenoid control of the clutch and brake quickly stop the machine in order to permit adjustments to be made or to attend to the source of bar supply so that a continuous supply is available.

The various pressure-actuated devices and their respective control valves may be connected to any desirable source of fluid pressure supply such as an air compressor or a source of hydraulic pressure. In the present machine compressed air is used to actuate these devices.

While the embodiment of the present invention as here-

What is claimed is as follows:

1. A commutator assembling machine comprising in combination, a stationary block having an annular chamber into which a row of alternate metal bars and insulating segments are directed to form them into an annulus; two rotatable discs, superposed and arranged so that a segmental area of one overlaps a segmental area of the second disc, each disc having equally spaced transverse holes arranged in a circular row concentric of the disc, one hole of said one disc aligning with the annular chamber in the block at the same time another hole of the said one disc aligns with a hole in the second disc; a pair of oppositely disposed, power actuated plungers coaxially aligned with the annular chamber in the block and the aligned hole in the one disc, the one plunger comprising an axially extending cylindrical plug positionable within the said hole on which to receive the annulus from the block and a radially extending shoulder engageable by the annulus to axially align the segment thereof within the said one hole, the other plunger comprising a sleeve operative to engage and transfer the annulus from the block to the aligned hole in the one disc with at least partial telescoping thereof on the said plug; and a second pair of oppositely disposed power actuated plungers in coaxial alignment with the two aligned holes in the two discs, one plunger when actuated providing an abutment cover for the hole in the second disc, the other plunger comprising an axially extending cylindrical plug and a radial shoulder extending therefrom engageable with the annulus in the one disc to maintain established alignment of the annulus segments during transfer of the annulus from the one disc into the hole in the second disc.

2. In a commutator assembling machine, the combination of, a stationary member having a cylindrical chamber, a plunger member positioned within said chamber movable relative thereto and cooperating therewith to form an annular chamber to receive a row of alternate metal and insulating segments and arrange the same into an annulus, a pair of superposed carrier discs each having a plurality of holes equally spaced concentric of the discs, said discs having overlapping portions to provide for sequential axial alignment of the holes in said discs in the overlapping portions thereof concurrently with alignment of a hole in one of said discs with said annular chamber, a second plunger means axially aligned with the first-mentioned plunger means and provided with a cylindrical portion for extension through a hole in said one disc to receive said annulus and including a radial shoulder to close said hole when in alignment with said annular chamber and form an abutment axially aligning the segments of the annulus, said first plunger means comprising a sleeve movable relative to said second plunger means and telescoping thereon to transfer an annulus from said stationary element to a hole in said one disc, a third plunger means axially aligned with the aligned holes in said discs in the overlapping portions thereof for transfer of an assembled annulus from said one disc to a hole in the other disc, said third plunger means including a cylindrical portion for positioning within an assembled annulus to maintain radial alignment of the segments and an enlarged portion engaging an end of the annulus to maintain axial alignment of the segments during transfer thereof from one disc to the other, said third plunger means also including a resiliently acting sleeve member telescoping enlarged portion thereon and movable therewith and relative to said first portion for resiliently engaging the annulus during transfer thereof and retraction of said plunger therefrom.

3. A commutator assembling machine comprising in combination, a stationary block having an annular chamber into which a row of alternate metal bars and insulating segments are directed to form them into an annulus; two rotatable superposed discs arranged that a segmental area of one disc overlaps a segmental area of the second disc, each disc having a plurality of equally spaced transverse holes arranged in a concentric circular row in the respective discs, one hole of said one disc aligning with the annular chamber in said block concurrently with alignment of another hole of the said one disc with a hole in the second disc, other holes in the discs being positioned between the stations at which the one hole aligns with the annular chamber and the holes align in the said discs; a pair of oppositely disposed power actuated plungers coaxially aligned with the annular chamber in the block and the hole in the said one disc aligned therewith, one of said plungers comprising an axially extending cylindrical plug positionable within the said hole aligned with said chamber on which to receive an annulus from the block and a radially extending shoulder thereon engageable by the annulus to axially align the segments thereof within the said one hole, the other of said plungers comprising a sleeve operative to engage the annulus in the block to transfer the same from the block to the hole in the disc aligned therewith with said sleeve telescoping said cylindrical plug; and a second pair of oppositely disposed power actuated plungers in coaxial alignment with a hole in said one disc positioned between the said stations, one of said second pair of plungers providing an abutment cover for the said hole between the said stations, the other of said second pair of plungers comprising an axially extending cylindrical plug having longitudinal grooves therein engageable with the segments of an annulus positioned within the cooperating hole in the disc for space positioning of the segments relative one to the other and for radial alignment of the said segments, said second plunger also including a spring urged sleeve surrounding the said cylindrical plug thereof resiliently engageable with one end of said annulus to urge the segments thereof against the abutment cover engageable with the opposite end of the annulus for axial alignment of the said segments.

4. A commutator assembling machine comprising in combination, a stationary block having an annular chamber into which a row of alternate metal bars and insulating segments are directed to form them into an annulus; two rotatable superposed discs arranged that a segmental area of one disc overlaps a segmental area of the second disc, each disc having a plurality of equally spaced transverse holes arranged in a concentric circular row in the respective discs, one hole of said one disc aligning with the annular chamber in said block concurrently with alignment of another hole of the said one disc with a hole in the second disc, other holes in the discs being positioned between the stations at which the one hole aligns with the annular chamber and the holes align in the said discs; a pair of oppositely disposed power actuated plungers coaxially aligned with the annular chamber in the block and the hole in the said one disc aligned therewith, one of said plungers comprising an axially extending cylindrical plug positionable within the said hole aligned with said chamber on which to receive an annulus from the block and a radially extending shoulder thereon engageable by the annulus to axially align the segments thereof within the said one hole, the other of said plungers comprising a sleeve operative to engage the annulus in the block to transfer the same from the block to the hole in the disc aligned therewith with said sleeve telescoping said cylindrical plug; a second pair of oppositely disposed power actuated plungers in coaxial alignment with a hole in said one disc positioned between the said stations, one of said second pair of plungers providing an abutment cover for the said hole between the said stations, the other of said second pair of plungers comprising an axially extending cylindrical plug having longitudinal grooves therein engageable with the segments of an annulus positioned within the cooperating hole in the disc for space positioning of the segments relative one to the other and for radial alignment of the said segments, said second plunger also including a spring urged sleeve surrounding the said cylindrical plug thereof resiliently engageable with one end of said annulus to urge the segments thereof against the abutment cover engageable with the opposite end of the annulus for axial alignment of the said segments, and a third pair of oppositely disposed power actuated plungers in coaxial alignment with the two aligned holes in the said discs, one of the plungers of said third pair providing an abutment cover for the hole in the said second disc, the other plunger of the third pair comprising an axially extending cylindrical plug engageable with the central opening of an annulus in said first disc and a radial shoulder engageable with one end of the annulus whereby to maintain the established alignment of the annulus segments during transfer of the annulus from the hole in the said one disc into the aligned hole in the said second disc.

References Cited in the file of this patent
UNITED STATES PATENTS

| | | |
|---|---|---|
| 664,516 | Watake | Dec. 25, 1900 |
| 1,267,345 | Anderson | May 21, 1918 |
| 1,758,653 | Cramer | May 13, 1930 |
| 1,899,325 | Hardman et al. | Feb. 28, 1933 |
| 1,979,434 | Baker | Nov. 6, 1934 |
| 2,031,417 | Kelcham et al. | Feb. 18, 1936 |
| 2,230,745 | Eiselstein | Feb. 4, 1941 |
| 2,237,359 | Ott | Apr. 8, 1941 |
| 2,340,448 | Andren | Feb. 1, 1944 |
| 2,370,828 | Widmont | Mar. 6, 1945 |
| 2,408,882 | Robbins | Oct. 8, 1946 |